(12) United States Patent
Kohn et al.

(10) Patent No.: US 7,133,888 B2
(45) Date of Patent: Nov. 7, 2006

(54) METHOD AND PROGRAMMABLE APPARATUS FOR QUANTUM COMPUTING

(75) Inventors: Wolf Kohn, Seattle, WA (US); Anil Nerode, Ithaca, NY (US)

(73) Assignee: Clearsight Systems Inc., Bellevue, WA (US)

( * ) Notice: Subject to any disclaimer, the term of this patent is extended or adjusted under 35 U.S.C. 154(b) by 144 days.

(21) Appl. No.: 10/780,292

(22) Filed: Feb. 17, 2004

(65) Prior Publication Data

US 2005/0015422 A1    Jan. 20, 2005

Related U.S. Application Data

(60) Provisional application No. 60/447,566, filed on Feb. 14, 2003.

(51) Int. Cl.
    *G06F 17/13*    (2006.01)
(52) U.S. Cl. .................................... 708/446
(58) Field of Classification Search ................ 708/446
    See application file for complete search history.

(56) References Cited

U.S. PATENT DOCUMENTS

| | | | | |
|---|---|---|---|---|
| 3,895,313 A | * | 7/1975 | Seitz | 372/103 |
| 5,706,404 A | * | 1/1998 | Colak | 706/33 |
| 2005/0109879 A1 | * | 5/2005 | Patterson | 244/172 |

* cited by examiner

*Primary Examiner*—D. H. Malzahn
(74) *Attorney, Agent, or Firm*—Olympic Patent Works PLLC

(57) ABSTRACT

A method and apparatus for quantum computing. A computer-program source code, data, and unsubstantiated output variables are converted into a class of computable functions by a program compiler. The computable functions are encoded, and a continualization method is applied to the encoded functions to determine a first-order, time-dependent, differential equation. Variational calculus is employed to construct a Lagrangian whose minimum geodesic is the solution for the first-order, time-dependent, differential equation. The Lagrangian is converted into a quantum, canonical, Hamiltonian operator which is realized as an excitation field via an excitation generator. The excitation field is repeatedly applied to a quantum processor consisting of a lattice of polymer nodes to generate an intensity-versus-vibrational-frequency spectrum of the lattice nodes. The average vibrational spectrum intensity values are used as coefficients in an approximating polynomial of the encoding function to determine the substantiated output variables, or program output.

20 Claims, 23 Drawing Sheets

|  501  |  502  |  503  |
|-------|-------|-------|
| $x_0$ | $x_1$ | f     |
| 0     | 0     | 2     |
| 0     | 1     | 1     |
| 0     | 2     | 1     |
| 1     | 0     | 0     |
| 1     | 1     | 2     |
| 1     | 2     | 2     |
| 2     | 0     | 1     |
| 2     | 1     | 0     |
| 2     | 2     | 0     |

504

| x | F |
|---|---|
| 0 | 2 |
| 1 | 1 |
| 2 | 1 |
| 3 | 0 |
| 4 | 2 |
| 5 | 2 |
| 6 | 1 |
| 7 | 0 |
| 8 | 0 |

METHOD AND PROGRAMMABLE APPARATUS FOR QUANTUM COMPUTING

CROSS-REFERENCE TO RELATED APPLICATION

This application claims the benefit of a provisional patent application No. 60/447,566, filed on Feb. 14, 2003.

TECHNICAL FIELD

The present invention is related to a method and programmable apparatus for quantum computing, and, in particular, a general method and programmable apparatus that uses quantum state propagation for quantum computing.

BACKGROUND OF THE INVENTION

Computer technology has evolved at an amazing rate in the past few decades. Further increases in the density of semiconductor integrated circuits may soon end due to the practical difficulties in patterning features with dimensions smaller than the wave length of ultraviolet light and soft x-rays. Ultimately, features cannot possibly be smaller than the length scale of single atoms and molecules.

At the molecular level, quantum effects may provided huge advantages as well as problems not encountered at larger dimensions. Quantum computing has recently emerged as a possible approach to developing smaller computing devices that operate on the atomic level. In general, a traditional computer encodes information in a series of bits for computation that are manipulated via Boolean logic, which is based on binary mathematics. For example, a 32-bit digital computer generally manipulates one or several 32-bit operands during execution of a single instruction. A single instruction generally produces one or several 32-bit result values, each representing one of $2^{32}$ different possible result values. Thus, a single instruction maps one or several operands to one or several results, each within a range of $2^{32}$ values. On the other hand, a typical quantum computer utilizes the +½ and −½ nuclear spin states for isotopes such as $^{13}C$ and $^{19}F$ to represent the Boolean logic one and zero. In addition, the nuclear spin is also a quantum mechanical object that can exist in a superposition of +½ and −½ nuclear spin states. In theory, a typical 32-quantum-bit quantum computer can produce any combination of $2^{32}$ values (i.e., $2^{32}!$ combinations) as a result of executing an instruction, providing for massive parallelism. However, in order to take advantage of the inherent ½-spin state of isotaopes such as $^{13}C$ and $^{19}F$, the processor must be operated at temperatures near absolute zero.

Computer manufacturers, engineers, and physicists have recognized the need for quantum computers that can handle the increasing demand for speed and computational volume and that are capable of operating at room temperature.

SUMMARY OF THE INVENTION

One embodiment of the present invention is directed towards a method and apparatus for quantum computing. In a described embodiment, data, a program, and uninitialized variables, or program output is provided. A compiler program converts the source code into an assembler code of computable functions. The computable functions are encoded by an encoding function. A continualization method is employed to determine a first-order, time-dependent, differential equation from the encoded functions. The variational principle is used to construct a Lagrangian whose minimum geodesic is the solution for the first-order, time-dependent, differential equation. The Lagrangian is converted into the quantum, canonical, Hamiltonian operator which is realized as an excitation field produced by an excitation generator. A control and scheduling system is employed to moderate the intervals between discrete applications of the excitation field produced by the excitation generator. The excitation field is repeatedly applied to a quantum processor consisting of a lattice of polymer nodes. The light radiation emitted by the quantum processor lattice of polymer nodes is converted by a transducer into an intensity-versus-vibrational-frequency spectrum. A running average of the intensity-versus-vibrational-frequency spectrum is maintained in the coherent memory. The average spectrum intensity values are used as coefficients in a polynomial approximating the encoding function. The output consists of the original data and program, and the substantiated variables, or program output.

DETAILED DESCRIPTION OF THE INVENTION

Figure 1:
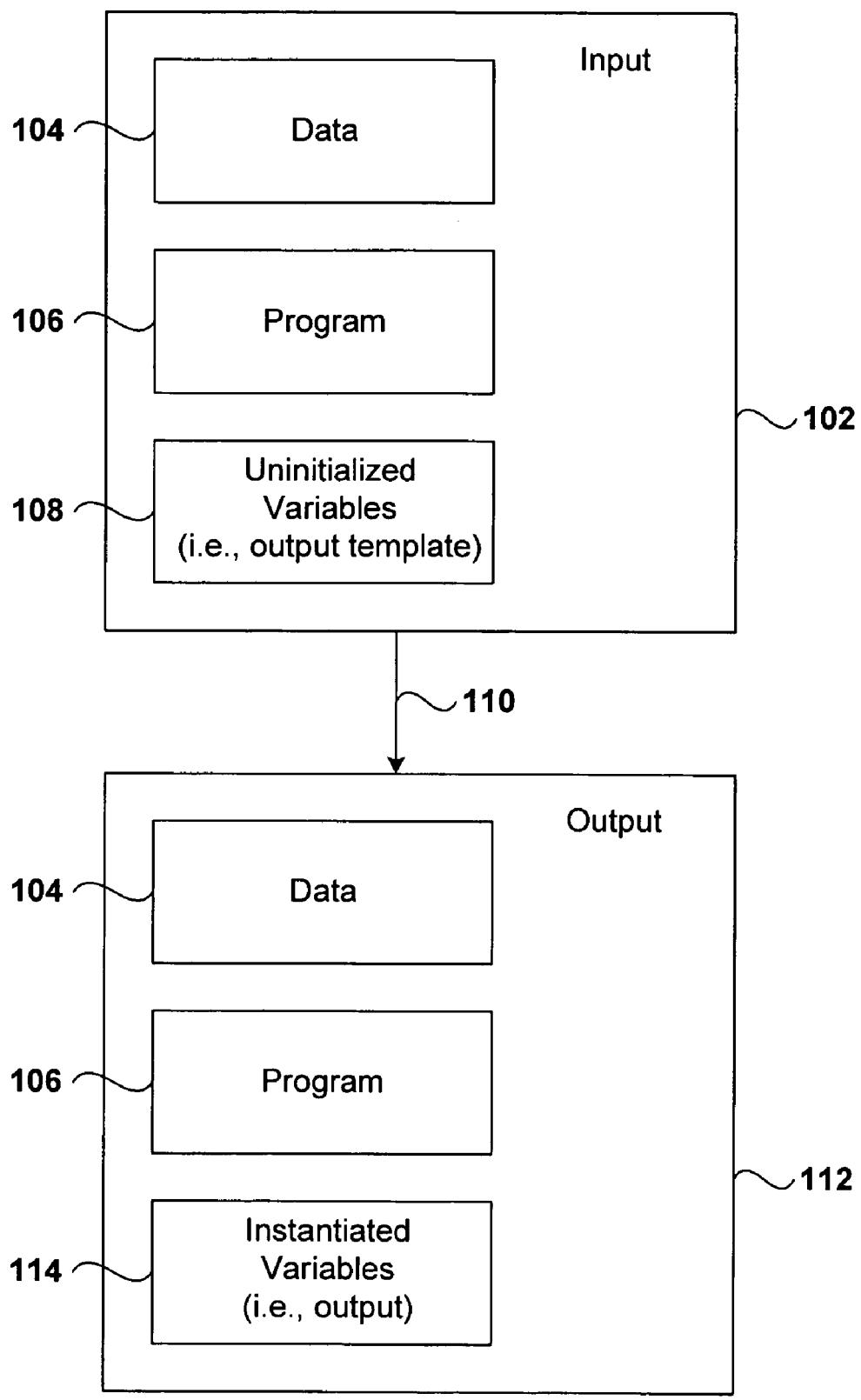
FIG. 1 shows a control-flow diagram for the highest-level view of the method of one of many possible embodiments of the present invention.

The present invention relates to a method and programmable apparatus termed the Quantum Function Evaluator that uses quantum state propagation for computational processing. FIG. 1 shows a control-flow diagram for the highest-level view of the method of one of many possible embodiments of the present invention. In step 102, the input consisting of data 104, a program 106, and uninitialized variables 108, or program output, is provided. The data 104 may be in the form of a separate file, input by an operator at the keyboard of computer, or actually incorporated into the text of the program 106. The program 106 may be a source code written in a high level programming language such as C, C++, FORTRAN, etc., or a lower level language such as assembler, or high level language such as scripting languages, shell scripts, or higher level mathematical programming languages. The uninitialized variables 108 represent program output, and may include data values transferred to any of many different output devices and types, including display terminals, electronic communications media, files or database management system data stored on mass storage devices, and many other types of output. Edge 110 represents executing one embodiment of the present invention that in a single iteration converts the input in step 102 into the output in step 112. In step 112, output includes the same data 104 and program 106. The uninitialized variables 108, however, are now instantiated variables 114 determined by execution of the method and apparatus of the present invention. Note that if the data 104 in step 102 is changed, then a separate execution of steps 102 and 112 is needed to determine the instantiated variables 114.

Figure 2:
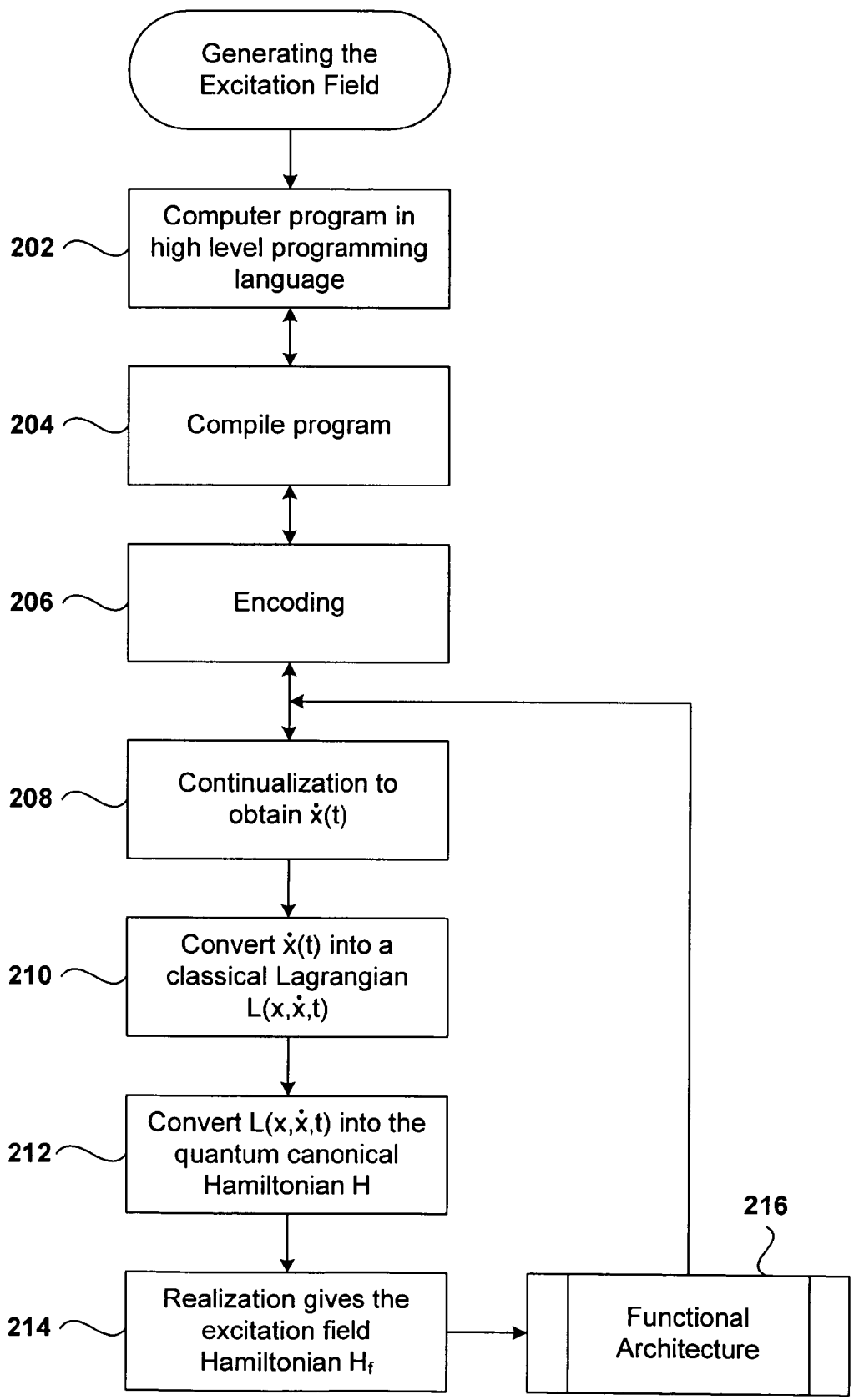
FIG. 2 shows a control-flow diagram for a mid-level view of the method and apparatus that represents one of many possible embodiments of the present invention.

FIG. 2 shows a control-flow diagram for a mid-level view of the method and apparatus that represents one of many possible embodiments of the present invention. Step 202 is the data 104, program 106, and uninitialized variables 108 described in step 102 in FIG. 1. Steps 204 through step 216 provide a more detailed description of the method represented by edge 110 in FIG. 1. In step 204, a compiler program converts the source code and data in step 202 into an assembly code representing a set of discrete valued computable functions. In step 206, the assembly code is converted into a discrete encoding of partial recursive functions. In step 208, a continualization method is employed to generate a continuous, first-order, time-dependent, differential equation from the encoded function determined in step 206. In step 210, the variational principle is employed to construct a Lagrangian whose geodesic is the solution for the first-order, time dependent, differential equation determined in step 208. In step 212, the Lagrangian is converted into a quantum, canonical, Hamiltonian operator. In step 214, the quantum, canonical, Hamiltonian operator is physically instantiated by producing an excitation field described by the quantum, canonical, Hamiltonian operator. In step 216, the routine "functional architecture," representing one of many possible embodiments of the present invention, is employed to determine the coefficients of a polynomial approximation to the encoding function in step 206. After the polynomial approximation is determined in step 216, steps 206 through 202 are performed in reverse order. In step 204, the polynomial approximation of the encoding function can be used to determine the computable functions in step 204, which leads to step 202, where the instantiated variables 114 in FIG. 1 are given.

Figure 3:
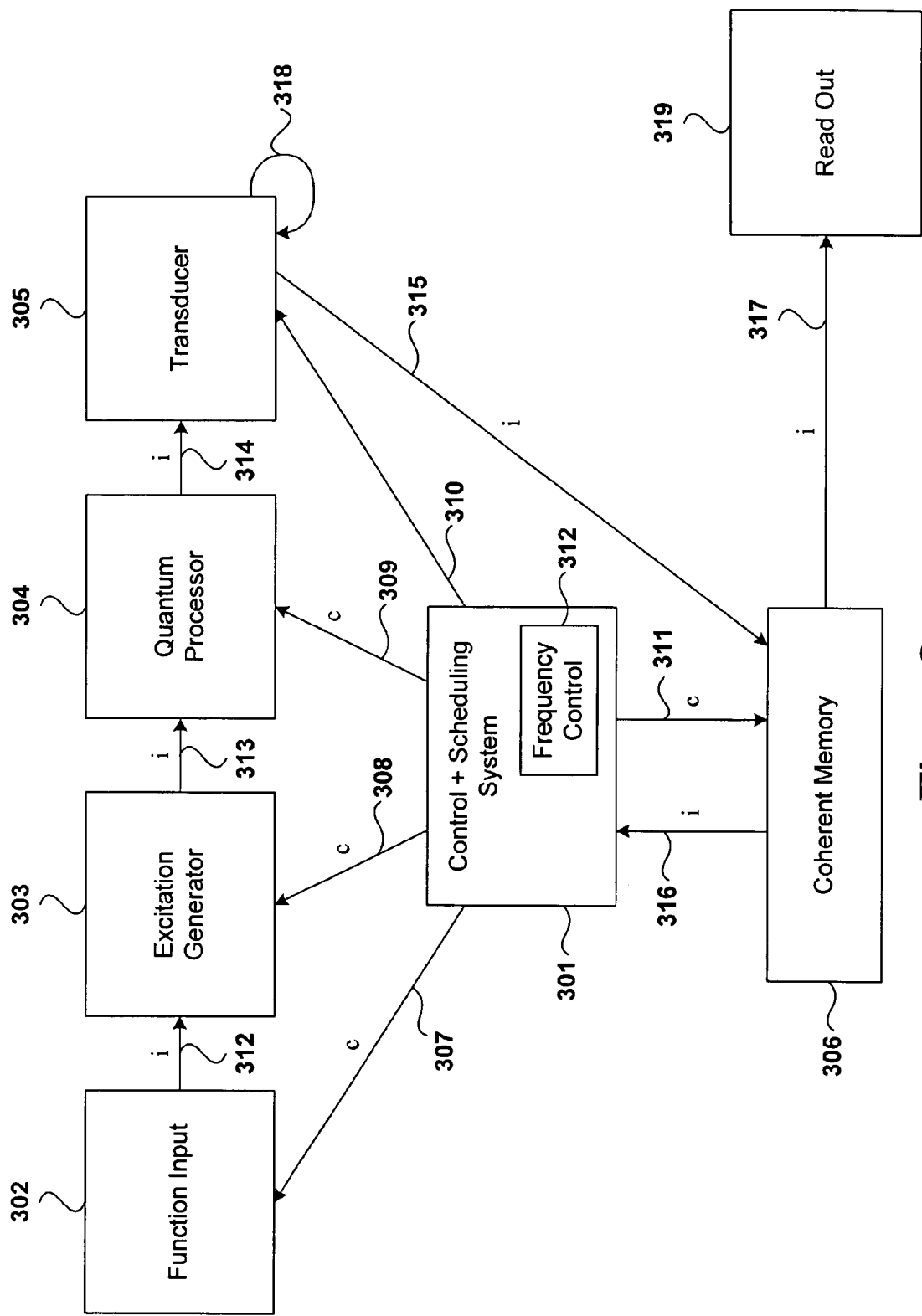
FIG. 3 shows a diagram of the apparatus comprising the "functional architecture" in FIG. 2 that represents one of many possible embodiments of the present invention.

FIG. 3 shows a diagram of the apparatus comprising the "functional architecture" 216 in FIG. 2 that represents one of many possible embodiments of the present invention. Located in the center of FIG. 3 is a control and scheduling system 301 that controls and regulates the execution of a function input 302, an excitation generator 303, a quantum processor 304, a transducer 305, and a coherent memory 306, as indicated by edges 307–311. Edges 312–317 indicate the direction in which information flows between the elements of the functional architecture. The function input 302 is employed to carry out steps 202 through 214 in FIG. 2 to determine the excitation field and pass the Hamiltonian characterizing the excitation field to an excitation generator 303. The excitation generator 304 realizes the excitation field which is used to induce an emission of light radiation from the polymer molecule nodes of the quantum processor 304. The excitation field generated by the excitation generator 303 may be an electric field, light, radio waves, or any other means that can be used to generate vibrational excitation of polymer molecules. The transducer 305 converts the emitted light radiation from the quantum processor 304 into a coherent spectrum of intensities and corresponding frequencies that are passed to, and stored by, the coherent memory 306. The transducer 305 is also responsible for clearing the light radiation detector after each reading of the emitted light radiation from the quantum processor 304, as indicated by edge 318. The coherent memory 306 maintains a running average of the intensities and frequencies received by the transducer 305. The control and scheduling system 310 repeatedly executes the excitation generator 303, the quantum processor 304, and the transducer 305 until the average spectrum intensities converge. Upon convergence of the spectrum, the average spectrum intensities are passed to read out 319 and subsequently used as the coefficients of the polynomial that approximates the encoding function in step 206 in FIG. 2.

Figure 4:
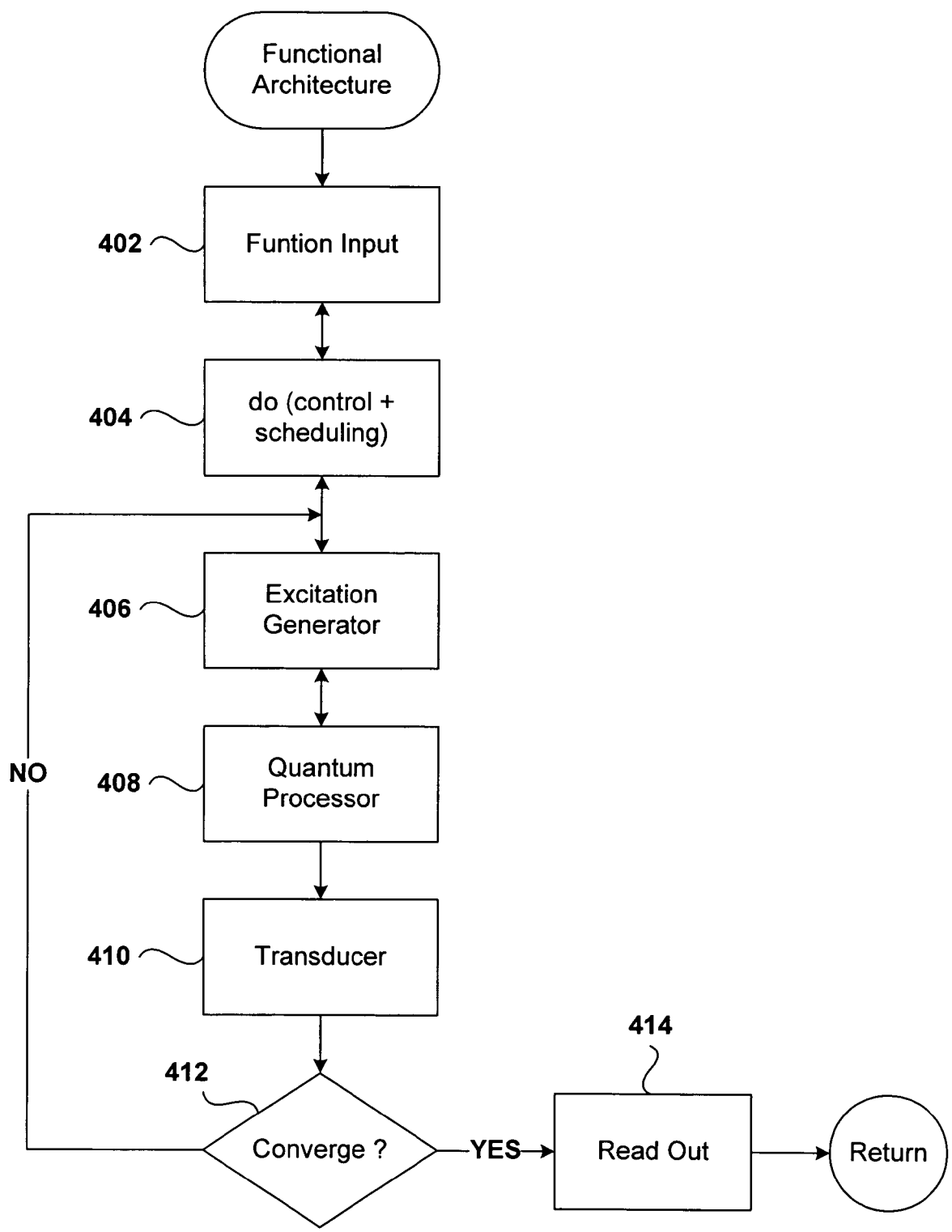
FIG. 4 is a control-flow diagram for the routine "functional architecture."

FIG. 4 is a control-flow diagram for the routine "functional architecture." In step 402, the function input determines the excitation field Hamiltonian according to steps 202 through 214, described above in relation to FIG. 2. In step 404, a do-loop representing the control and scheduling system 310, described above in relation to FIG. 3, executes steps 406, 408, 410, and 412. In step 406, the excitation generator realizes the excitation field Hamiltonian by bringing into physical existence an actual excitation field. In step 408, the quantum processor is impinged by the excitation field causing the polymer nodes to emit light radiation. In step 410, the emitted light radiation is converted into an intensity-versus-light-wave-frequency spectrum and a running average is maintained. In step 412, if the running average converges, then in step 414, the spectrum of intensities are used as coefficients of the approximating polynomial to the encoding function in step 206 in FIG. 2. In step 412, if the running average has not converged, then steps 406, 408, 410, and 412 are repeated.

I. Quantum Computing

A. Input Function and Encoding

The computable functions generated in step 104 above are discrete valued functions referred to as "input functions." The input functions may be of the form:

$$f: S_1 \times \ldots \times S_N \to D \qquad (1)$$

where N is the dimension of the domain $S_1 \times \ldots \times S_N$, and the sets $S_i$ and D are finite subsets of the natural numbers given by:

$$S_i = \{0, \ldots, N_i\}$$

$$D = \{0, \ldots, N_d\}$$

where $N_i$ and $N_d$ are the largest natural numbers in the sets $S_i$ and D, respectively. The function $f$ in equation (1) maps an N-tuple denoted $(x_0, \ldots, x_{N-1})$ in the domain $S_1 \times \ldots \times S_N$, where $x_{i-1}$ is an element in the set $S_i$, to a single natural number in the range D. The N-tuples $(x_0, \ldots, x_{N-1})$ are referred to as "points" in the domain $S_1 \times \ldots \times S_N$.

Figures 5A, 5B:
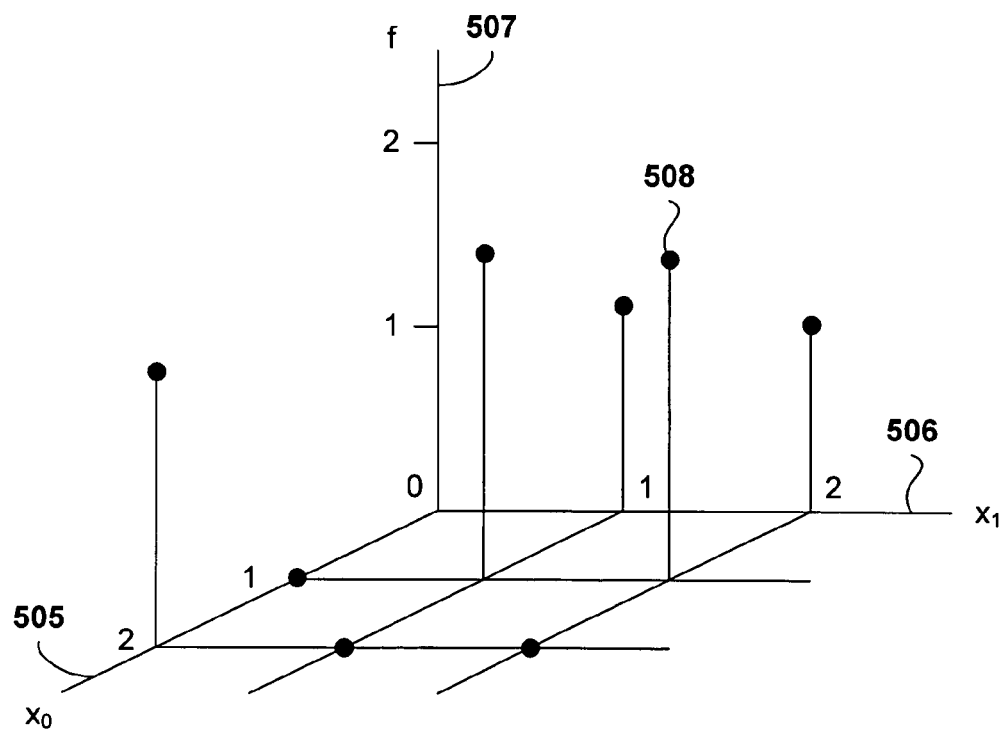
FIGS. 5A–B illustrate a simple example input function.

FIGS. 5A–B illustrate a simple example input function having the form of equation (1) given by:

$$f: S_1 \times S_2 \to D$$

where the domain $S_1 \times S_2$ is the set of all possible combination of points $(x_0, x_1)$ such that $x_0$ and $x_1$ are respectively elements in the set:

$$S_1 = \{0, 1, 2\}$$

and $$S_2 = \{0, 1, 2\}$$

The range of the example function $f$ is given by the set:

$$D = \{0, 1, 2\}$$

FIG. 5A shows a three column table of domain and range values of example function $f$. The $x_0$-column 501 and $x_1$-column 502 contain the domain elements of $S_1 \times S_2$, and the range values are located in $f$-column 503. FIG. 5B is a three-dimensional, Cartesian-coordinate depiction of the points $(x_0, x_1, f)$ given in the table in FIG. 5A. The collection of points $(x_0, x_1, f)$ are plotted with respect to the $x_0$-axis 505, the $x_1$-axis 506, and the $f$-axis 507. For example, the point 508 in FIG. 5B is the graphical representation of the point in row 504 in FIG. 5A.

It should be noted that, although two and three-dimensional illustrations, such as FIGS. 5A–B are provided in the following discussion, they are provided only for illustration purposes. In real-world applications, there may be many thousands, hundreds of thousands, or millions of variables, leading to extremely high dimensional problem domains. In general, these problem domains may be considered to be hyper-dimensional volumes, manifolds, or carrier manifolds. It is not possible to illustrate such problem domains, but techniques used to address hyper-dimensional domains may be analogized to three-dimensional illustrations.

The input function may also be a solution of an iterative process of the form:

$$y_{n+1,i} = f_i(y_{n,1}, \ldots, y_{n,k}) \qquad (2)$$

where $i = 1, \ldots, k$, and each $$f^i: S^k \to S$$

where $S = \{0, 1, \ldots, N_S\}$.

The encoding of computable functions as described above in step 206 of FIG. 2 can be accomplished using the following function:

$$F: [0, 1, \ldots, p^{N-1}] \to [0, 1, \ldots, p] \qquad (3)$$

where $$x = \sum_{s=0}^{N-1} x_s \cdot p^{N-1-s} \qquad (4)$$

and p is a natural number defined by:

$$p = \max_{i,d}\{\{N_i \mid i = 1, \ldots, N\}, N_d\} + 1 \qquad (5)$$

and $$F_i(x) = \begin{cases} f_i(x_0, \ldots, x_{N-1}) & \text{if defined} \\ 0 & \text{otherwise} \end{cases} \qquad (6)$$

The encoding functions (3)–(6) map the domain values in $S_1 \times \ldots \times S_N$ to a subset of points of the real numbers such that the values of F coincide with the values of $f$ in the range of $f$. Furthermore, the encoding functions (3)–(6) map x to 0 for any x that corresponds to an N-tuple not in the domain of $f$.

Figures 6A, 6B:
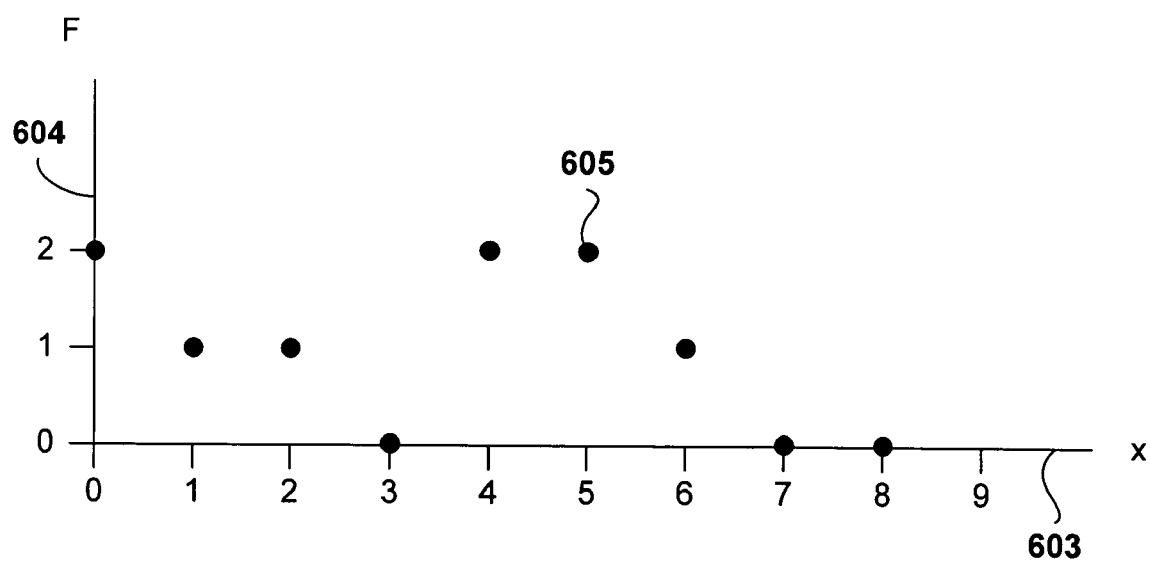
FIGS. 6A–B illustrate the application of the encoding in equations (3)–(6) to the simple example function.

FIGS. 6A–B illustrate application of the encoding in equations (3)–(6) to the simple example function. The value for the natural number p given by equation (5) is given by:

$$p = \max_{i,d}\{\{2, 2\}, 2\} + 1 = 3$$

The encoding function in equation (4) maps the points $(x_0, x_1)$ in the domain $S_1 \times S_2$ to a subset of the real numbers according to the expression:

$$x = \sum_{s=0}^{1} x_s \cdot p^{1-s} = x_0 3 + x_1 \qquad (7)$$

In FIG. 6A, the x-column 601 are the x-values calculated according to equation (7), and F-column 602 are the corresponding encoded function values F. In FIG. 6B, the collection of points (x, F) displayed in FIG. 6A are plotted with respect to the x-axis 603 and the F-axis 604. For example, the point (1, 2, 2) 508 in FIG. 5B is mapped to the point (5, 2) 605 in FIG. 6B.

The example input functions given in equations (1) and (2) are functions of a larger class of discrete-valued functions generated by the compiler program in step 204 in FIG. 2. The class of functions generated in step 204 is referred to as the "Class I" of computable functions and are given as follows:

(i) Class I contains all the functions F encodable from a finite function $f$ as in equations (3)–(6).

(ii) If $$\{f_1, \ldots, f_K | f_i : S_1 \times \ldots \times S_N \to S_{N+1}, K \text{ finite},$$
$$S_i = \{1, \ldots, N_i | N_i \text{ finite}\}\}$$

is a subset of Class I, so is the direct sum:

$$f_1 \oplus \ldots \oplus f_K : S_1 \times \ldots \times S_N \to S_{N+1}{}^K$$

(iii) Class I contains the projection functions:

$$p_i : S_1 \times \ldots \times S_N \to S_i$$

where $p_i(n_1, \ldots, n_i, \ldots, n_N) = n_i$ (iv) If $$\{f_1, \ldots, f_K | f_i : S_1 \times \ldots \times S_N \to S_{N+1}, K \text{ finite}, \\ S_i = \{1, \ldots, N_i | N_i \text{ finite}\}\}$$

is a subset of Class I and $$g : S_{N+1}{}^K \to S_{N+1}$$

is in Class I, so is the composition:

$$g(f_1, \ldots, f_K) : S_1 \times \ldots \times S_N \to S_{N+1}$$

(v) If for each n ∈ N, $$g : N \times S_1 \times \ldots \times S_K \to N$$

is in Class I so is the following:

$$\min\{n, g(n, n_1, \ldots, n_K) = 0\}$$

(vi) If $$g : N \times S_K \to S_K$$

is in Class I, then the family of functions given by:

$$\{f : N \times S_1 \times \ldots \times S_K \to S_{K+1} | f(n+1, n_1, \ldots, n_K) = \\ g(n, f(n, n_1, \ldots, n_K))\}$$

is in Class I.

(vii) Any function constructed by the finite application of (i)–(vi) is in I.

The elements of Class I are either an encoding or can be transformed into an encoding function via a finite number of steps (ii)–(vii) above. Clauses (ii)–(iv) are included because these clauses are constructed by the compiler program found in many high-level programming languages. Although the Class I of computable functions includes only completely specified functions, in alternate embodiments the method of the present invention can be modified to handle the larger class of discrete partially specified functions and indicator functions.

The central objective behind the method and apparatus of the present invention is to find effective and fast means of computing the discrete Class I functions via quantum approximations to the encoding functions.

B. Continualization

The method of continualization is described in detail in patent application Ser. No. 10/693,729 and is incorporated by reference. The example function provided in FIGS. 5 and 6 can be continualized using a step function Φ defined by:

$$\Phi : [0, \ldots, p^{N-1}) \to [0, \ldots, p^{N-1})$$

$$\Phi(y) = F(x) \text{ for each } y, y \in [x, x+1), y \in \{0, \ldots, p^{N-1}\} \quad (8)$$

Figure 7A:
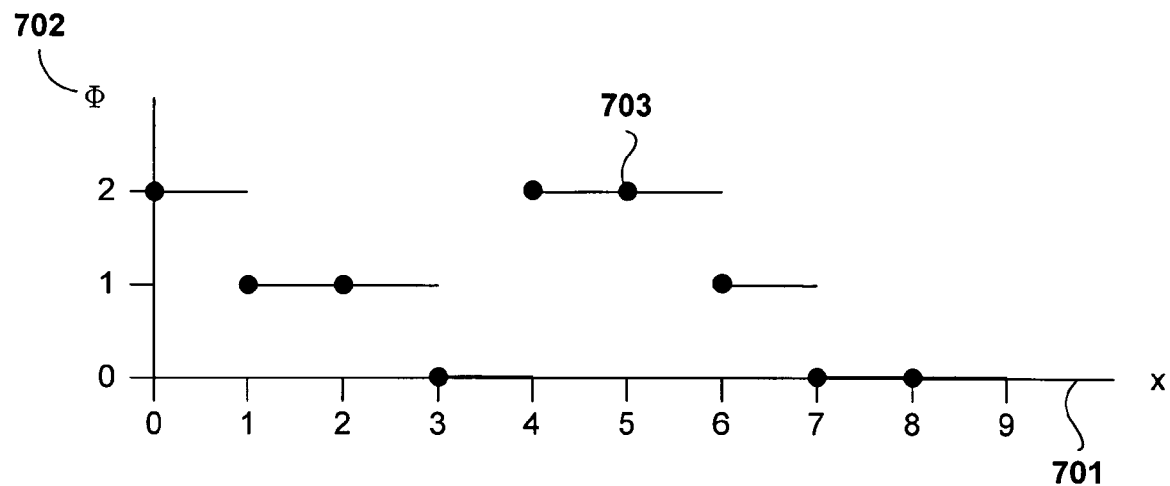
FIG. 7A is an illustration of continualization of the encoding function F in FIGS. 3A–B via the step function in equation (8).
Figure 7B:
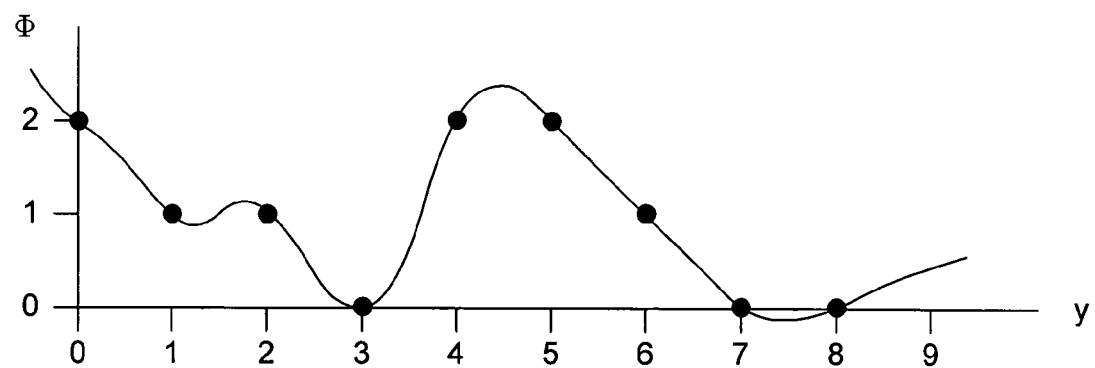
FIG. 7B is an illustration of a hypothetical interpolating function $\Phi(y)$.

FIG. 7A illustrates continualizing the encoding function F shown in FIGS. 6A–B via the step function in equation (8). Continualization increases the size of the domain by including the real numbers between the discrete domain values x and assigns to each y a function value Φ(y). FIG. 7A shows the graph of step-function Φ(y) coincide respect to the x-axis 701 and the Φ-axis 702. The function values F(x) equal to Φ(y) where the discrete x values equal the discrete domain y values. For example, the point (5, 2) 703 in FIG. 7A is the point (5, 2) 605 in FIG. 6B.

The continualization process is not limited to the step function given by equation (4). In alternate embodiments, other interpolation schemes can be used to construct a function Φ(y) whose values coincide with F(x) such as linear interpolations, Adams-Boshworth interpolation, splines, Pade interpolation, etc. FIG. 4B is an illustration of a hypothetical interpolating function Φ(y), where Φ(y) equals the encoding function F(x) for values of y equal to the discrete domain values x.

Figure 8A:
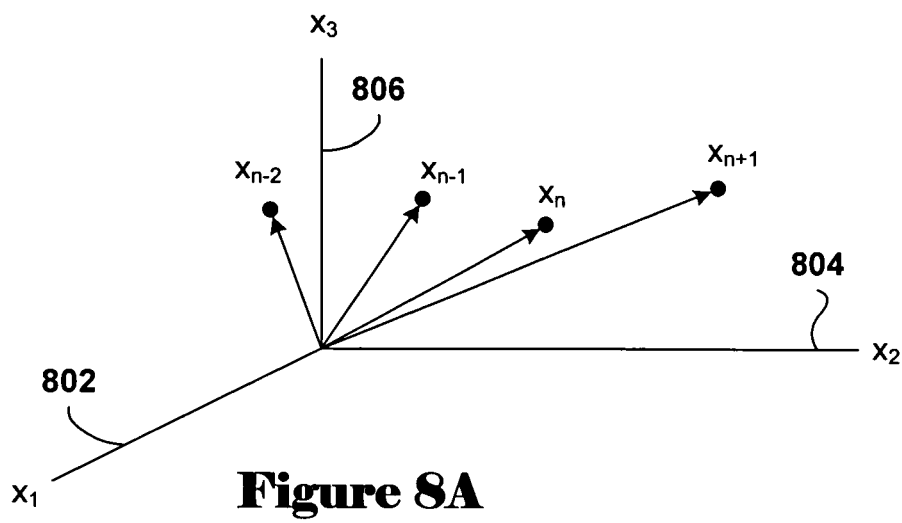
FIGS. 8A–F illustrate the continualization method for a hypothetical sequence in three-dimensions.
Figure 8B:
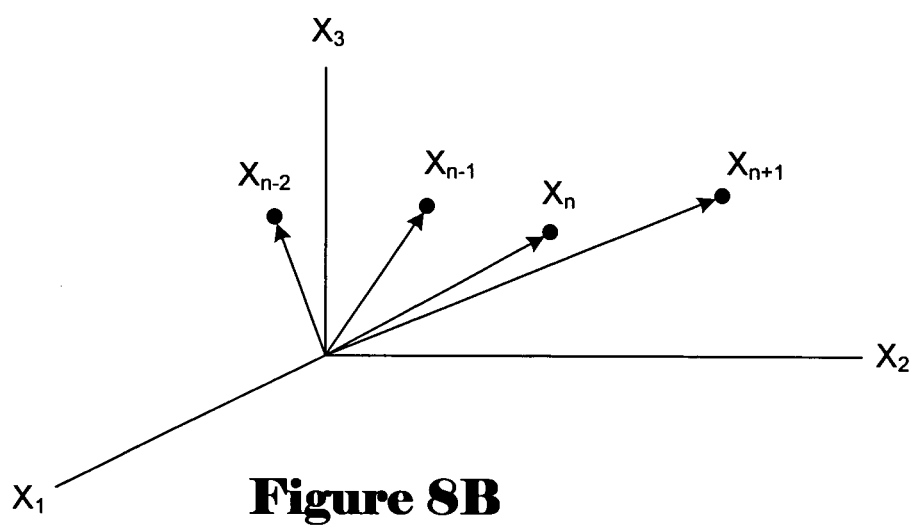

The interpolating function Φ(y) may be expressed for hyper-dimension manifolds as a sequence of real vectors $\{x_0, x_1, \ldots\}$ defined by the following recursion relation given by:

$$x_{n+1} = x_n + a_n h(x_n) \quad (9)$$

where each vector $x_n$ is a k-tuple in k-dimensional set of real numbers $R^k$ given by:

$$x_k = (x_{1,k}, x_{2,k}, \ldots, x_{N,k})$$

and sequence $\{a_n\}$ is a sequence of real numbers having the properties:

$$\lim_{n \to \infty} a_n = 0$$

$$\sum_n a_n = \infty$$

and h is function mapping from $R^k$ to $R^k$. In other words, a new state-vector value $x_{n+1}$ is computed, in each iteration of a computation, from a current state-vector $x_n$ and a discrete, vector-valued function h that depends on $x_n$. FIG. 8A–F illustrate the continualization method for a hypothetical sequence in three-dimensions. FIG. 8A shows the vectors $x_{n-2}$, $x_{n-1}$, $x_n$, and $x_{n+1}$ plotted in $R^3$ with respect to the $x_1$-axis 802, the $x_2$-axis 804, and the $x_3$-axis 806. Next, the sequence $(x_n)_{n \geq 0}$ can be approximated by the sequence $(X_n)_{n \geq 0}$ having terms satisfying the recursion relation given by:

$$X_{n+1} = X_n + a_n h(X_n) + a_n b_n \quad (10)$$

where $b_n$ is a vector parameter. FIG. 8B shows the sequence given by the approximating recursion relation in equation (10). The sequence of vectors $(x_n)_{n \geq 0}$ shown in FIG. 8A have been replaced by the sequence of vectors $(X_n)_{n \geq 0}$ in FIG. 8B.

The time sequence $\{t_n\}$ can be defined as follows:

$$t_n = \sum_{i=0}^{n-1} a_i \quad (11)$$

where $a_i = t_{i+1} - t_i$.

Figure 8C:
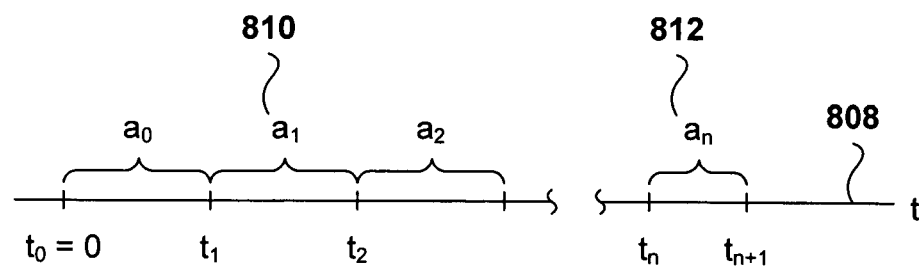

FIG. 8C is an illustration of the relationship between the time sequence $\{t_n\}$ and the real number sequence $\{a_n\}$ given in equations (9) and (10). Note that because each element $a_n$ approaches zero as n approaches infinity, the real number sequence $\{a_n\}$ is the length of the decreasing time intervals $(t_{n+1} - t_n)$ on the time axis 808. For example, real number $a_j$ 810 is a longer interval than $a_n$ 812.

Next, two time dependent vector functions $X^0(t)$ and $g^0(t,a,b)$ are defined as follows:

$$X^0(t_n) = X_n \text{ for all } n \geq 0 \tag{12}$$

$$X^0(t) = \frac{t_{n+1} - t}{a_n} X_n + \frac{t - t_n}{a_n} X_{n+1} \text{ if } t \in (t_n, t_{n+1}) \tag{13}$$

and $$g^0(t_n, a, b) = \sum_{i=0}^{n-1} a_i b_i \text{ for all } n \geq 0 \tag{14}$$

$$g^0(t, a, b) = \frac{t_{n+1} - t}{a_n} g^0(t_n, a, b) + \frac{t - t_n}{a_n} g^0(t_{n+1}, a, b) \tag{15}$$

if $t \in (t_n, t_{n+1})$

Figure 8D:
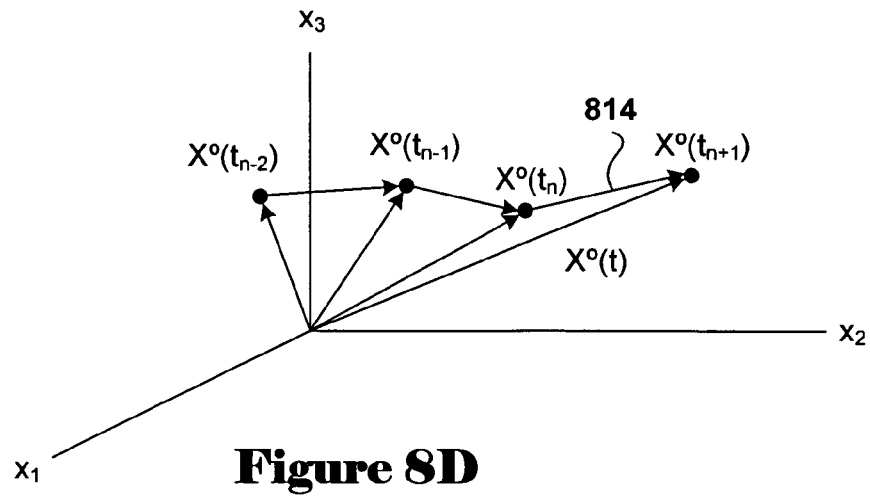

Equations (13) and (15) are linear functions with respect to time t. FIG. 8D is an illustration of the functions defined by equation (13) and shows that segment $X^0(t)$ 814 is a vector between the vectors $X_n$ and $X_{n+1}$ in $R^3$.

A function $\overline{X}^0$ can be defined by the following:

$$\overline{X}^0(t) = X_n \text{ for } t \in (t_n, t_{n+1}) \tag{16}$$

Figure 8E:
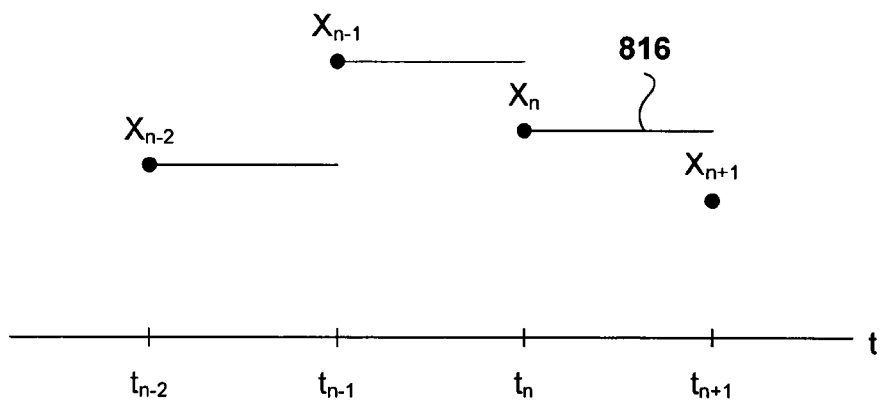

FIG. 8E is an illustration of the equation (16) plotted as a function of time t. The function values are plotted as a step function to show that $\overline{X}^0(t)$ 816 is constant on the time interval $(t_n, t_{n+1})$.

Summing the terms in equation (10) from zero to n−1 gives the following expression:

$$\sum_{i=0}^{n-1} X_{i+1} = \sum_{i=0}^{n-1} X_i + \sum_{i=0}^{n-1} h(X_i) a_i + \sum_{i=0}^{n-1} a_i b_i \tag{17}$$

After some algebra and applying the definition of the integral from integral calculus, equation 17 can be given as continuous, vector-valued function of time t as follows:

$$X^0(t) = X^0(0) + \int_0^t h(\overline{X}^0(s)) ds + g^0(t, a, b) \tag{18}$$

The functions defined as:

$$X^n(t) = \begin{cases} X^0(t + t_n) & \text{if } t > -t_n \\ X_0 & \text{if } t \leq -t_n \end{cases}$$

$$g^n(t, a, b) = \begin{cases} g^0(t + t_n, a, b) - g^0(t_n, a, b) & \text{if } t > -t_n \\ -g^0(t_n, a, b) & \text{if } t \leq -t_n \end{cases}$$

can be used to rewrite equation (18) in the following form:

$$X^n(t) = \begin{cases} X^n(0) + \int_0^t h(\overline{X}^n(t_n + s)) ds + g^0(t, a, b) & \text{if } t > -t_n \\ X_0 & \text{if } t \leq -t_n \end{cases} \tag{19}$$

Equation (19) can be expressed equivalently as follows:

$$X^n(t) = \begin{cases} X^n(0) + \int_0^t h(\overline{X}^n(s)) ds + g^n(t, a, b) + e^n(t) & \text{if } t > -t_n \\ X_0 & \text{if } t \leq -t_n \end{cases}$$

where the sequence of functions $e^n(t)$ and $g^n(t,a,b)$ approach zero as n approaches infinity uniformly on finite time intervals $(t_{n+1} - t_n)$. The time dependent sequence $\{X^n(t)\}$ is bounded and equicontinuous on interval $(-\infty, \infty)$. Thus by the Arezla-Ascoli Lemma, there is a convergent subsequence of the sequence of functions $\{X^n(t)\}$ whose limit is the vector function X(t) that satisfies the following:

$$\dot{X}(t) = h(X(t))$$

where $\dot{X}$ is a shorthand notation for the time derivative of X.

The sequence of functions $\{g^n(t,a,b)\}$ are also bounded and equicontinuous on interval $(-\infty, \infty)$. Again, applying by the Arezla-Ascoli Lemma, there exists a convergent subsequence of functions $\{g^n(t,a,b)\}$ whose limit is the vector function g(t,a,b). Thus the original discrete sequence given by equation (9) can be modeled by the first-order, time-dependent, differential equation given by:

$$\dot{x}(t) = h(x(t)) - \dot{g}(t, a, b) \tag{20}$$

Figure 8F:
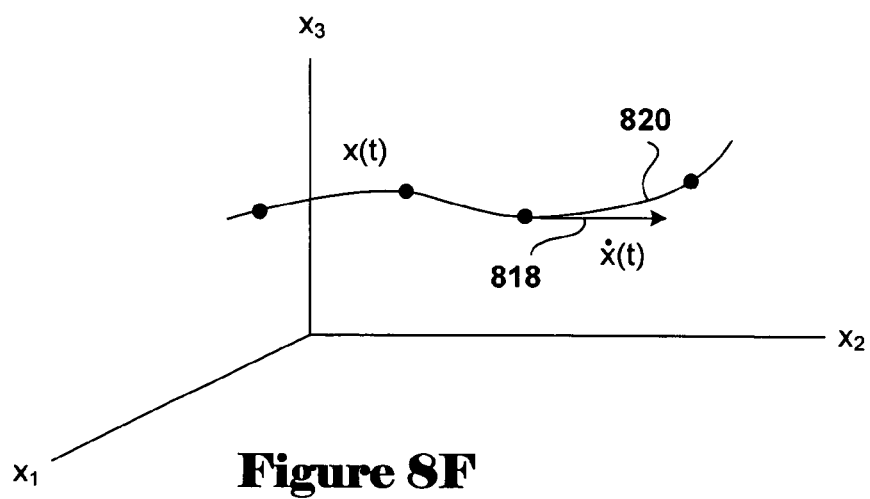

FIG. 8F is an illustration of the differential equation (20) as a tangent vector 818 to the vector solution functions x(t) 820.

C. Variational Model

The variational model is used to formulate a Lagrangian for the first-order, time-dependent, differential equation (20) in step 210 in FIG. 2. The procedure begins with the variational problem formulated in terms of the Lagrangian given by:

$$L(x, \dot{x}, t)$$

First, the Lagrangian is assumed to have to the following properties:

(1) The Lagrangian is homogeneous of degree 1 in $\dot{x}$. In other words, $$L(x, \lambda \dot{x}, t) = \lambda L(x, \dot{x}, t) \text{ for a real valued } \lambda \geq 0.$$

(2) The Lagrangian is positive definite in $\dot{x}$. In other words, $$(g_{ij}(x, \dot{x}, t)) = \left( \frac{1}{2} \frac{\partial^2 (L^2(x, \dot{x}, t))}{\partial \dot{x}_j \partial \dot{x}_i} \right)$$

Properties (1) and (2) allow for the definition of a metric ground form ds on the carrier manifold such that $$ds^2 = \sum_{ij} g_{ij}(x, \dot{x}, t) dx_i dx_j \tag{21}$$

A geodesic is the path that represents the shortest path between any two points when the path is restricted to a particular surface. The geodesics subject to the metric ground in equation (21) are the extremum of the corresponding parametric calculus of variations problem which is to find a curve on the manifold which minimizes the following integral:

$$\int_{t_0}^{t_1} L(x(t), \dot{x}(t), t) dt \quad (22)$$

satisfying the endpoint conditions. The geodesics are solutions to the Euler-Lagrange equation given by:

$$\frac{d}{ds}\frac{\partial L(x, \dot{x}, t)}{\partial \dot{x}_i} - \frac{\partial L(x, \dot{x}, t)}{\partial x_i} = 0 \quad (23)$$

Figure 9:
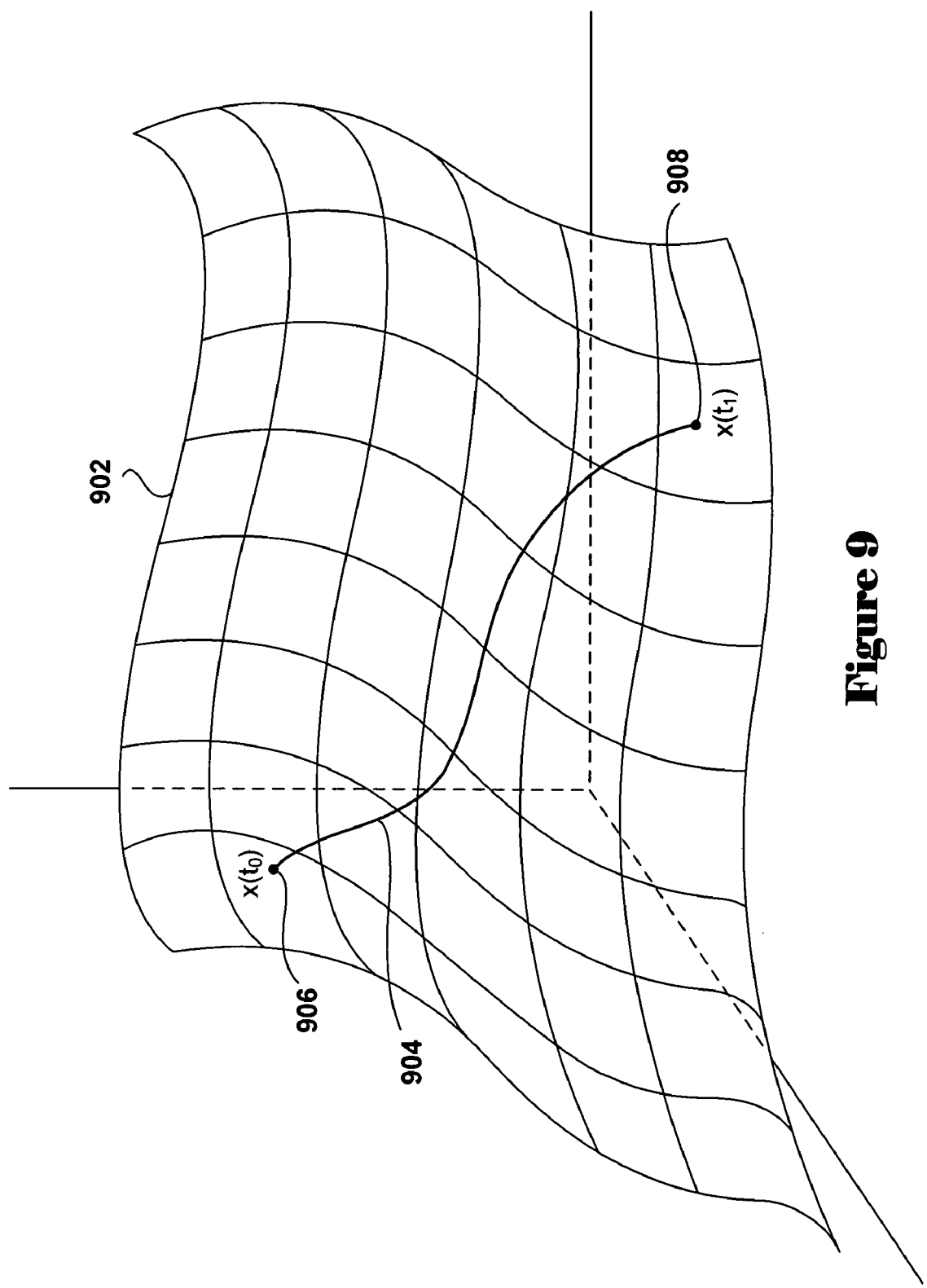
FIG. 9 is an illustration of a hypothetical geodesic solution x(t) of equation (23) on the three-dimensional carrier manifold.

FIG. 9 is an illustration of a hypothietical geodesic solution x(t) 904 of equation (23) on the three-dimensional surface carrier manifold 902. The path followed by the geodesic solution x(t) 904 is the minimum path between the starting point $x(t_0)$ 906, which represents the data 104, program 106, and uninitialized variables 108 in step 102 in FIG. 1, and the ending point $x(t_1)$ 908 represents the data 104, program 106, and instantiated variables 114 in step 112 in FIG. 1.

Second, the vector function x(t) defines a trajectory that has an integral within an $\epsilon$ of its minimum and is referred to as the $\epsilon$-optimal control.

Third, the Lagrangian L(x, u, t) is replaced by L*(x, u, t) which is the convexification of the Lagrangian L with respect to u. Then an existence theorem for the relaxed controls can be applied to L*(x, u, t) to ensure that the optimal control problem has a relaxed solution. The relaxed solution can be approximated to obtain an $\epsilon$-optimal control for the original problem.

Fourth, for any pre-specified $\epsilon$, the $\epsilon$-optimal control can be computed for the original problem and implement $\epsilon$-optimal control as a finite-state, physically-realizable, control automaton. The actual control law issued by the finite-control automaton at state x is a chattering control. The chattering is among approximations to some local extrema of L(x, u).

The desired evolution of solution x(t) to the first-order, time-dependent, differential equation (20) is assumed to by define a path along a geodesic of the carrier manifold. In other words, there is a desired Lagrangian L(x,ẋ,t) which induces a metric on the carrier manifold as described in equation (21) by the evolution of a function x(t) satisfying equation (20). The covariant partial derivatives on the carrier manifold are defined as follows:

$$\frac{\partial_c}{\partial_c x} \text{ and } \frac{\partial}{\partial_c \dot{x}}$$

There exists a covariant partial derivative with respect to time t, however, time is an invariant, therefore the covariant partial derivative with respect to time t is just:

$$\frac{\partial_c}{\partial_c t} = \frac{\partial}{\partial t}$$

Therefore, the transformation from local coordinates to coordinates on the carrier manifold is given by:

$$\frac{\partial_c x_j}{\partial_c x_i} = \frac{\partial x_j}{\partial x_i} + \sum_l \Gamma_{l,i}^j x_l$$

where $\Gamma_{l,i}^j$ are the Christoffel coefficient arising from the Levi-Civita connection associated with the metric in equation (21). The Christoffel coefficients may be computed explicitly via the formula:

$$\Gamma_{l,i}^j = \frac{1}{2}\sum_k g^{j,k}\left(\frac{\partial}{\partial x_i}g_{k,l} + \frac{\partial}{\partial x_l}g_{k,i} - \frac{\partial}{\partial x_k}g_{l,i}\right)$$

where $(g^{i,j})$ is the inverse of the metric ground form matrix given by:

$$(g_{ij}(x, \dot{x})) = \left(\frac{1}{2}\frac{\partial^2(L^2(x, \dot{x}))}{\partial \dot{x}_j \partial \dot{x}_i}\right)$$

For convenience, the covariant partial derivatives The derivation begins by taking the derivative with respect to time t of both sides of equation (20) to give the following expression:

$$\ddot{x} = \frac{\partial_c h}{\partial_c x}\dot{x} - \ddot{g}(t, a, b) \quad (24)$$

where $\dot{x}=[\dot{x}_i]$ and $\ddot{x}=[\ddot{x}_i]$ are column vectors and $$\frac{\partial_c h}{\partial_c x} = \left[\frac{\partial_c h_i}{\partial_c Y_j}\right]$$

is a k×k matrix. The Lagrangian L is a function mapping defined as follows:

L:TM×R→R where TM is the tangent bundle and the Lagrangian L(x,ẋ,t) satisfies the Euler-Lagrange equation given by:

$$\frac{d}{dt}\left(\frac{\partial_c L}{\partial_c \dot{x}}\right) - \frac{\partial_c L}{\partial_c x} = 0 \quad (25)$$

where $$\frac{d}{dt}\left(\frac{\partial_c L}{\partial_c \dot{x}}\right)$$

and $$\frac{\partial_c L}{\partial_c x}$$

are column vectors

Expanding the time derivative in equation (25) gives the following:

$$\frac{\partial L}{\partial_c x \partial_c \dot{x}} \dot{x} + \frac{\partial_c^2 L}{\partial_c \dot{x} \partial_c \dot{x}} \ddot{x} + \frac{\partial}{\partial t}\left(\frac{\partial_c L}{\partial_c x}\right) - \frac{\partial_c L}{\partial_c x} = 0 \quad (26)$$

The Lagrangian L $(x,\dot{x},t)$ is assumed to be three times differentiable, and the mixed partial derivatives of $L(x,\dot{x},t)$ are assumed to be continuous so that order of differentiation does not make any difference for mixed partial derivatives of $L(x,\dot{x},t)$ of degree 2 or 3. Thus taking the partial derivative of equation (26) with respect to $\dot{x}_k$ of the ith component gives the following:

$$\sum_j \frac{\partial_c^3 L}{\partial_c \dot{x}_k \partial_c \dot{x}_i \partial_c x_j} \dot{x}_j + \frac{\partial_c^2 L}{\partial_c x_k \partial_c \dot{x}_i} + \quad (27)$$

$$\sum_j \frac{\partial_c^3 L}{\partial_c \dot{x}_k \partial_c \dot{x}_i \partial_c \dot{x}_j}\left(\sum_l \frac{\partial_c h_j}{\partial x} \dot{x}_l - \ddot{g}_j(t, a, b)\right) +$$

$$\sum_j \frac{\partial L}{\partial_c \dot{x}_j \partial_c \dot{x}_i} \frac{\partial h}{\partial x} - \frac{\partial_c L}{\partial_c x} + \frac{\partial}{\partial t}\left(\frac{\partial_c^2 L}{\partial_c \dot{x}_k \partial_c \dot{x}_i}\right) - \frac{\partial_c^2 L}{\partial_c \dot{x}_k \partial_c x_i} = 0$$

Equation (27) can be rewritten as:

$$\frac{d}{dt}\left(\frac{\partial_c^2 L}{\partial_c \dot{x}_k \partial \dot{x}_i}\right) + \sum_j \frac{\partial_c^2 L}{\partial_c x_j \partial_c \dot{x}_i} \frac{\partial h}{\partial_c x_k} + \frac{\partial_c^2 L}{\partial_c x_k \partial_c \dot{x}_i} - \frac{\partial_c^2 L}{\partial_c \dot{x}_k \partial_c x_i} = 0 \quad (28)$$

Thus, equation (28) can be rewritten in matrix form as follows:

$$\frac{d}{dt}\left(\frac{\partial_c^2 L}{\partial_c \dot{x} \partial_c \dot{x}}\right) + \frac{\partial_c^2 L}{\partial_c x \partial_c \dot{x}} - \frac{\partial_c^2 L}{\partial_c \dot{x} \partial_c x} = -\left(\frac{\partial_c^2 L}{\partial_c x \partial_c \dot{x}}\right)\frac{\partial h}{\partial_c x} \quad (29)$$

Taking the transpose of both sides of equation (29) and using the partial differential property given by:

$$\left(\frac{\partial_c^2 L}{\partial_c x \partial_c \dot{x}}\right) = \left(\frac{\partial_c^2 L}{\partial_c \dot{x} \partial_c x}\right)^T$$

gives the following:

$$\frac{dQ}{dt} = -\frac{1}{2}\left(\frac{\partial_c h}{\partial_c x}\right)^T Q - \frac{1}{2} Q\left(\frac{\partial_c h}{\partial_c x}\right)$$

where $$Q = \frac{\partial_c^2 L}{\partial_c \dot{x} \partial_c \dot{x}} \quad (30)$$

Equation (30) can be explicitly solved for by integrating along the path of the characteristic, second-order, partial-differential equation given by:

$$\ddot{x}(t) = \frac{\partial_c h}{\partial_c x} x(t) - \ddot{g}(t, a, b)$$

D. Quantization

In this section the development turns to an alternative statement of the structure and formulation known as the "quantum, canonical, Hamiltonian operator" as first introduced in step 212 in FIG. 2. The usefulness of the Hamiltonian viewpoint lies in providing a framework for theoretical extensions in many areas of physics and provides much of the language with which present day quantum mechanics is constructed.

In the Lagrangian formulation given above, the system is characterized by the time-dependent, vector-valued function $x(t)$ of k independent degrees of freedom and is a problem with k independent variables $x_k$, and k time derivatives $\dot{x}_k$. The Hamiltonian is fundamentally different from the Lagrangian, because the Hamiltonian is formulated in terms of the position coordinates $x_k$ and the associated momenta $p_k$ (*Classical Mechanics* 2$^{nd}$ *Edition*, Herbert Goldstein, Addison-Wesley Publishing Co., New York, 1980). The Lagrangian formulation is transformed into a Hamiltonian formulation by first taking the total time derivative of the Lagrangian $L(x,\dot{x},t)$ to get:

$$\frac{dL}{dt} = \sum_k \frac{\partial L}{\partial x_k} \dot{x}_k + \sum_k \frac{\partial L}{\partial \dot{x}_k} \ddot{x}_k + \frac{\partial L}{\partial t} \quad (31)$$

Next, the Euler-Lagrangian equation (25) is substituted into equation (31) to give the following equation:

$$\frac{d}{dt}\left(\sum_k \dot{x}_k \frac{\partial L}{\partial \dot{x}_k} - L\right) = -\frac{\partial L}{\partial t} \quad (32)$$

The quantity in the brackets is referred to as the "energy function" and is denoted by:

$$\hat{h}(x, \dot{x}, t) = \sum_k \dot{x}_k \frac{\partial L}{\partial \dot{x}_k} - L(x, \dot{x}, t) \quad (33)$$

The energy function (33) can be reformulated in terms of the linear conjugate momenta $p_k$ which are associated with the coordinates $x_k$ and are determined by the equation:

$$p_k = \frac{\partial L}{\partial \dot{x}_k} \quad (34)$$

The conversion from the Lagrangian formulation to the Hamiltonian formulation is treated strictly as a mathematical problem by substituting equation (34) into equation (33). Thus, the energy function given by equation (33) can now be represented as a Hamiltonian function of the coordinates $x_k$ and conjugate momenta $p_k$ given by:

$$H(x, p, t) = \sum_k p_k \cdot \dot{x}_k - L(x, \dot{x}, t) \quad (35)$$

Equation (35) is written in this manner to stress the fact that the Hamiltonian is always considered as a function of the coordinates (x,p,t), whereas the Lagrangian is a function of the coordinates (x,$\dot{x}$,t).

Using the classical mechanical expression for the Lagrangian given by:

$$L(x, \dot{x}, t) = \sum_k \frac{1}{2} m_k \dot{x}_k^2 - V$$

where V is a potential energy function of x or both x and time t, equation (35) can be rewritten as a function of the canonical variables (x, p) to give the classical mechanical Hamiltonian:

$$H(x, p, t) = \sum_k \frac{p_k^2}{2m_k} + V = E \quad (36)$$

If the potential energy is free of the time t, the system described by the Hamiltonian in equation (36) is said to be conservative, which means that no energy is being added to or removed from the system.

The Hamiltonian expressed in equation (36) best characterizes dynamical systems that behave in a continuous manner. However, the Hamiltonian as formulated in equation (36) is not adequate for characterizing the quantum mechanical method and apparatus of the present invention, because the present invention relies on the behavior of atoms and molecules, which exists in a certain number of stationary or quantum states.

The Hamiltonian in equation (36) can be modified to characterize the quantum behavior exhibited by atoms and molecules by substituting the differential operators:

$$E \rightarrow i\hbar \frac{\partial}{\partial t}$$

and $$p_k \rightarrow \frac{\hbar}{i} \frac{\partial}{\partial x_k}$$

into equation (36) (*Quantum Mechanics*, Albert Messiah, Elsevier Science Publishers, The Netherlands, 1961). The resulting equation is the quantum, canonical, Hamiltonian operator given by:

$$H\left(x, \frac{\hbar}{i}\frac{\partial}{\partial x}, \frac{\partial}{\partial t}\right) = \sum_k -\frac{\hbar^2}{2m_k} \frac{\partial^2}{\partial x_k^2} + V = i\hbar \frac{\partial}{\partial t} \quad (37)$$

that characterizes the behavior of a quantum mechanical system such as an atom or molecule. Equation (37) is called an "operator" because the kinetic energy and total energy have respectively been replaced by the differential operators given by:

$$\frac{\partial^2}{\partial x_k^2} \text{ and } \frac{\partial}{\partial t}.$$

The Hamiltonian in equation (37) is a second-order, differential, wave equation. In general, the solutions to the Hamiltonian given in equation (37) are complex-valued, wave functions that depend on spatial coordinates, time, and integer parameters. The wave function solutions of the Hamiltonian are given by:

$$\Psi_n(x,t) = |\Psi_n(t)\rangle \quad (38)$$

where the integer parameter n is referred to as the "quantum number." In general, there are an infinite number of solutions $|\Psi_n(t)\rangle$, referred to as "eigenfunctions," "eigenstates," or "states," that contain all the information that can be determined about the state of the system such as position, momentum, and energy. The set of solutions $\{|\Psi_n(t)\rangle\}$ given by equation (38) form a basis for a Hilbert space, and therefore, given any two eigenfunctions $|\Psi_n(t)\rangle$ in the Hilbert space $\{|\Psi_n(t)\rangle\}$:

$$\langle \Psi_i(t) | \Psi_j(t) \rangle = \int \Psi_i^*(x,t) \Psi_j(x,t) dx = \begin{cases} 1 & \text{if } i = j \\ 0 & \text{if } i \neq j \end{cases} \quad (39)$$

where $\Psi_i^*$ is the complex conjugate of $\Psi_i$.

The Hamiltonian given by equation (38) can also be rewritten as an eignevalue problem in the form:

$$H|\Psi_n(t)\rangle = \left(\sum_k -\frac{\hbar^2}{2m_k}\frac{\partial^2}{\partial x_k^2} + V\right)|\Psi_n(t)\rangle = \lambda_n |\Psi_n(t)\rangle \quad (40)$$

where $\lambda_n$ is the energy of the system in the state $|\Psi_n(t)\rangle$ and is referred to as an "eigenvalue." Prior to a measurement of the quantum mechanical system characterized by the Hamiltonian, the system is assumed to be represented by a linear combination of state functions $|\Psi_n(t)\rangle$ as follows:

$$|\Omega(t)\rangle = \sum_i c_i |\Psi_i(t)\rangle \quad (41)$$

where $|\Omega(t)\rangle$ is the state function for the entire system and $c_i$ are complex-valued coefficients. When a measurement of the system is made, the system is observed in only one of the eigenstates $|\Psi_i(t)\rangle$ in equation (41), where the probability of observing the system in the state $|\Psi_i(t)\rangle$ is the square of the coefficient, $|c_i|^2$.

The potential energy function V in equation (40) characterizes the particular physics of the system under observation such as the rotational and/or vibrational motion of a molecule, or the electronic states of an atom or molecule. For example, substituting a potential V characterizing the vibrational behavior of a diatomic molecule, referred to as $V_{vib}$, into the Hamiltonian, gives the vibrational eigenstates $|\Psi_n(t)\rangle$ and the accompanying vibrational energy eigenvalues $\lambda_n$.

Figure 10A:
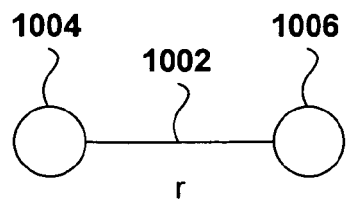
FIGS. 10A–C illustrate the Morse potential and spectrum for a hypothetical diatomic molecule.
Figure 10B:
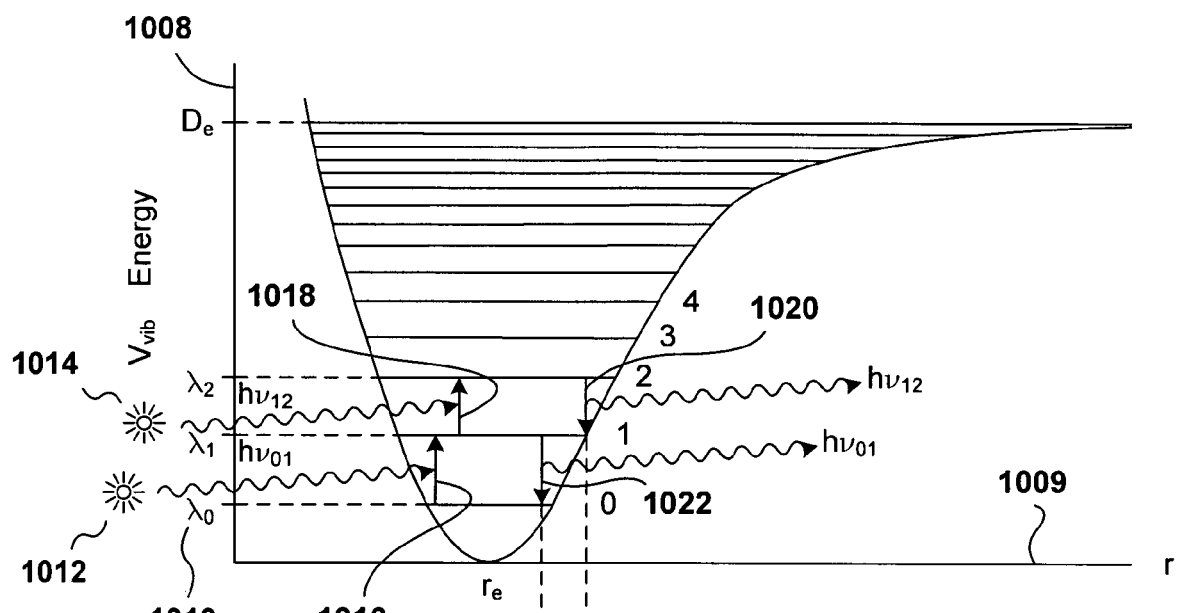
Figure 10C:
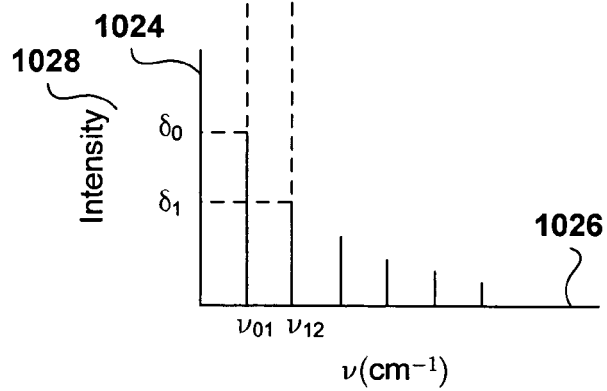

FIGS. 10A–C illustrate the Morse potential and spectrum for a hypothetical diatomic molecule. The vibrational potential of a diatomic molecule may be approximated by the Morse potential given by:

$$V_{vib} = D_e(1 - \exp(-\kappa r))^2$$

where $D_e$ is the energy required to completely disassociate the diatomic molecule, $\kappa$ is the curvature at the potential minimum, and r is bond length 1002 between atoms 1004 and 1006 shown in FIG. 10A. The Morse potential characterizes the interaction between the atoms 1004 and 1006.

FIG. 10B is an illustration of the Morse potential and the quantized vibrational energy levels. The Hamiltonian representing the vibrational behavior of a hypothetical diatomic molecule is given by:

$$H|\chi_n\rangle = \left(\sum_k -\frac{\hbar^2}{2m_k}\frac{\partial^2}{\partial x_k^2} + V_{vib}\right)|\chi_n\rangle = \lambda_n|\chi_n\rangle$$

where $\{|\chi_n\rangle\}$ is the set of vibrational states of the diatomic molecule, and $\{\lambda_n\}$ is the set of corresponding eigenvalues. The potential energy $V_{vib}$ is plotted as a function of the inter-atomic bond distance r 1002 of atoms 1004 and 1006 in FIG. 10A, where the energy is represented by the vertical axis 1008, and the inter-atomic bond distance r is represented by the r-axis 1009 in FIG. 10B. The lowest vibrational state is $|\chi_0\rangle$ with the accompanying energy eigenvalue $\lambda_0$ 1010 is referred to as the "ground state."

In FIG. 10B, the light sources 1012 and 1014 emit photons with energy given by:

$$h\nu_{i,j} = \lambda_{i,j}$$

where $\nu_{i,j}$ is the light frequency, and $$\lambda_{i,j} = \lambda_j - \lambda_i$$

The hypothetical diatomic molecule absorbs a photon from source 1012 having frequency $\nu_{0,1}$, and the diatomic molecule experiences an increase in vibrational energy by an amount $\lambda_{1,2}$, as indicated by edge 1016. The transition from the ground state to a higher energy state is referred to as "excitation," and the molecule is said to exist in an "excited state." The hypothetical diatomic molecule now has an energy eigenvalue $\lambda_1$ and the state of the molecule has transitioned from the ground state $|\chi_0\rangle$ to the excited state $|\chi_1\rangle$. Edge 1018 shows a second transition from the state $|\chi_1\rangle$ to the excited state $|\chi_2\rangle$ resulting from absorption of a photon with frequency $\nu_{1,2}$ emitted from light source 1014. In this hypothetical example, the excited states are generated using light of a particular frequency. It should be noted that atoms and molecules may also experience excitation to higher quantum states by application of an electrical field.

Atoms and molecules also emit photons to the surroundings as they transition from an excited state to a lower energy state. The process of transitioning to a lower energy state is referred to as "relaxation" or "thermal relaxation." Edge 1020 shows the relaxation of the hypothetical diatomic molecule from the excited state $|\chi_2\rangle$ with energy eigenvalue $\lambda_2$ to the state $|\chi_1\rangle$ with energy eigenvalue $\lambda_1$. The transition from the state $|\chi_2\rangle$ to the state $|\chi_1\rangle$ results in the emission of a photon with the frequency $\nu_{1,2}$. Edge 1022 shows a transition from the state $|\chi_1\rangle$ to the ground state $|\chi_0\rangle$ and the emission of a photon with the frequency $\nu_{0,1}$.

The emitted photon can be observed by a detector to generate a spectrum of the different observed frequencies of light for an ensemble of diatomic molecules. FIG. 10C is an illustration of the ensemble average of the spectrum of gas phase hypothetical diatomic molecules as described in relation to FIGS. 10A–B. The horizontal axis 1024 is the observed quantized vibrational frequencies for the ensemble and the vertical axis 1026 is the intensity associated with each vibrational frequency. The spectrum of the hypothetical molecule reveals a tapering off in the intensity with higher vibrational frequencies. The intensity is a measure of the fraction of diatomic molecules in a particular vibrational state. Emission line 1028 has the largest intensity $\delta_0$ and can be used to approximate the fraction of hypothetical diatomic molecules in the state $|\chi_0\rangle$. Therefore, according to equation (41) the state function describing the ensemble of diatomic molecules can be given by:

$$|\Omega\rangle = \sum_i c_i|\chi_i\rangle \cong \sum_i \sqrt{\delta_i}\,|\chi_i\rangle$$

where $|c_i|^2 \cong \delta_i$

E. Realization

Realization is the process of transforming the canonical, quantum, Hamiltonian operator in equation (40) into a physical operation of the hardware to solve for the function $\Phi(x)$. The function $\Phi(x)$ may be expanded in terms of an orthogonal basis set of p-valued Chrestenton functions spanning the Hilbert space $\gamma_p$ given by:

$$B_p = \{\phi_k(x)|\phi_k(x):[0,p^{N-1}] \to [0,p^{N-1}], k=0,\ldots,p^{N-1}\}$$

where the general form of a Chrestenton basis function is given by:

$$\phi^j(x) = \exp\left(\frac{2\pi}{p}i\sum_{s=0}^{N-1} j_{N-1-s}\cdot x_s\right)$$

with $$x = \sum_{s=0}^{N-1} x_s \cdot p^{N-1-s}$$

and $$j = \sum_{s=0}^{N-1} j_s \cdot p^{N-1-s}$$

Therefore, the interpolating functions $\Phi(x)$, written in terms of the orthogonal basis set $B_p$ is given by:

$$\Phi(x) = \sum_{k \in [0, p^{N-1}]} \beta_k \phi_k(x) \quad (42)$$

where $$\beta_k = \frac{\int_0^{p^N} \phi_k^*(x) \Phi(x) dx}{\int_0^{p^N} \phi_k^*(x) \phi_k(x) dx} \quad (43)$$

The set of coefficients $\{\beta_k\}$ is referred to as the spectrum of the function in equation (42), where the number of terms in the spectrum $\{\beta_k\}$ ranges from about $10^5$ to $10^{12}$. If the spectrum $\{\beta_k\}$ is known, then the function $\Phi(x)$ can be used to determine the encoding function F(x) as described above in relation to steps 216 and 206 in FIG. 2. The encoding function F(x) can then be used to determine the original function $f(x)$ as described above in relation to steps 204 and 202 in FIG. 2. The objective of the present invention is to determine a spectrum that approximates the spectrum $\{\beta_k\}$.

The hardware of the system is characterized by the hardware Hamiltonian operator referred to as "$H_0$." The realization step consists of constructing the excitation-field Hamiltonian $H_f$, referred to as "$H_f$" so that the hardware, when interacting with the excitation field $H_f$, satisfies the following condition:

$$|H_0 + H_f - H| \leq \epsilon \quad (44)$$

where $|\cdot|$ denotes an operator norm, and $\epsilon$ is an a parameter chosen to satisfy the precision requirements for the computation.

In general, the eigenvalues of the composite Hamiltonian $H_0 + H_f$ approximate the spectrum $\{\beta_k\}$ of the function given by equation (42). Let $\{\lambda_k | k=1, \ldots, N\}$ be the subset of the eigenvalues of $H_0 + H_f$ with the corresponding eigenstates $\{|\Psi_k(t)\rangle | k=1, \ldots, N\}$ so that if $$(H_0 + H_f)|\Psi_k(t)\rangle = \lambda_k |\Psi_k(t)\rangle \quad (45)$$

then $$|\lambda_k - \beta_k| \leq \frac{\varepsilon}{N} \quad (46)$$

and $$\int_0^\infty |\phi_k(x) - |\Psi_k(x)\rangle| dx \leq \varepsilon \quad (47)$$

where $\phi_k$ is a Chrestenton basis function. Therefore, the interpolating function $\Phi(x)$ given in equation (42) can be approximated as follows:

$$\Phi(x) \cong \sum_k \sqrt{\lambda_k} \phi_k(x) \quad (48)$$

Thus, a discrete function can be approximated by exciting the hardware system $H_0$, according to the excitation-field Hamiltonian $H_f$ to obtain the set of coefficients for equation (48). The encoding function can then be constructed from equation (48) which in turn can be used to determine the Class I functions, as described above in relation to reversing steps 206–202 in FIG. 2.

II. The Functional Architecture for Quantum Computing

A. Function Input

The function input 302 in FIG. 3 symbolically determines the excitation-field Hamiltonian $H_f$ via the steps 202–214 described above in relation to FIG. 2. The process of symbolically determining the excitation-field Hamiltonian $H_f$ is referred to as the "compilation process."

B. Excitation Generator

The excitation generator 303 in FIG. 3 receives the symbolic excitation-field Hamiltonian $H_f$ from the function input 302 and converts the symbolic description of $H_f$ into a physical implementation to be carried out by the quantum processor. The excitation generator addresses each node of the quantum processor according to the desired state behavior given by:

$$i\hbar \frac{\partial}{\partial t} |\Psi_j(t)\rangle = (H_0 + H_f) |\Psi_j(t)\rangle \quad (49)$$

where $|\Psi_j(t)\rangle$ is the state function of the jth node in the quantum processor.

C. Quantum Processor

Figure 11:
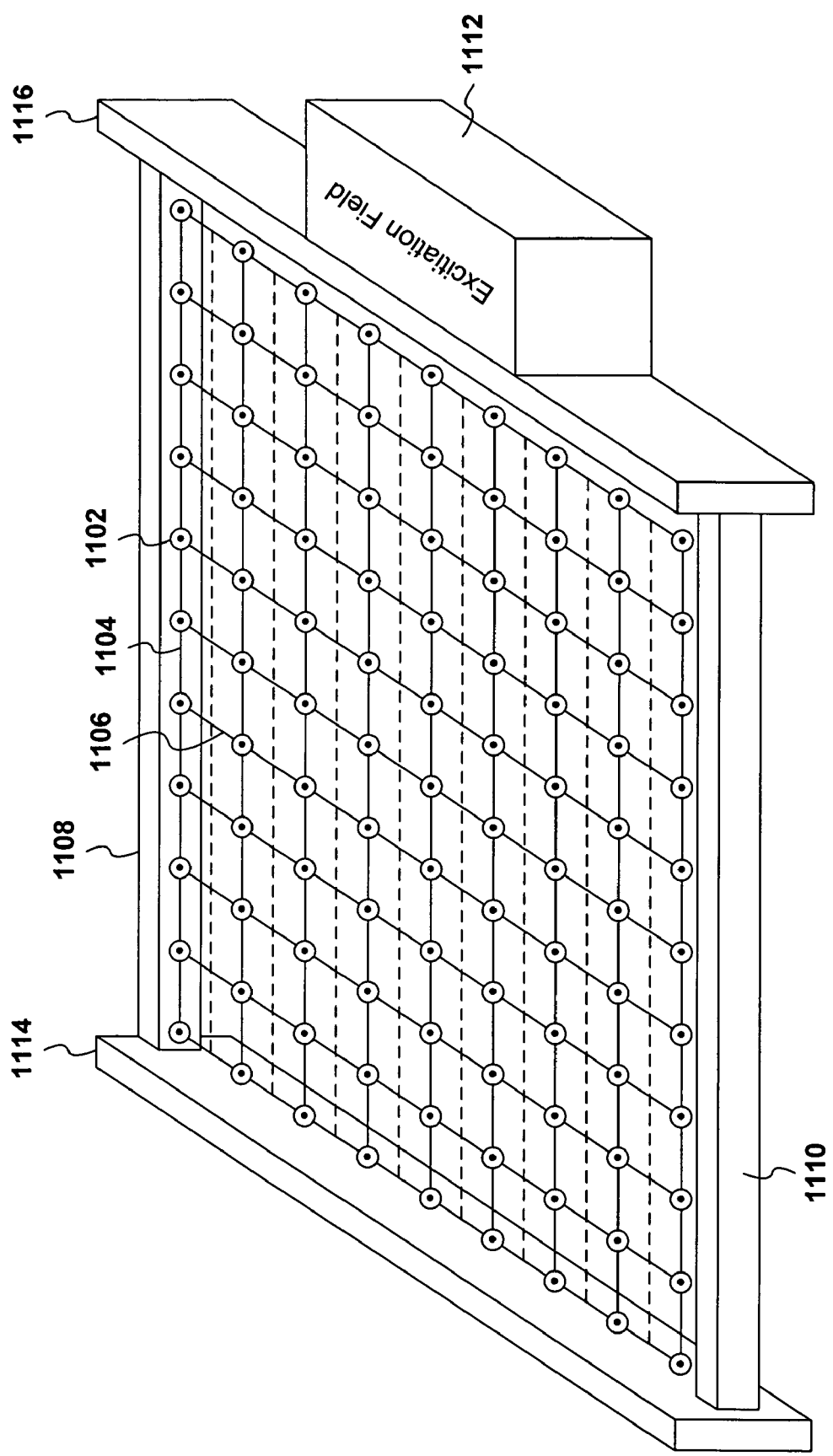
FIG. 11 is an illustration of a quantum processor having a two-dimensional array of nodes representing one of many possible embodiments of the present invention.

FIG. 11 is an illustration of a quantum processor 304 in FIG. 3 having a two-dimensional array of nodes representing one of many possible embodiments of the present invention. The nodes 1102 are chemical polymers linked to adjacent nodes in the lattice via quantum lateral bonds 1104 and quantum forward bonds 1106. The boundaries 1106 and 1108 provide an insulating barrier to prevent the electric field from leaking out to the surrounding components of the system. The quantum processor also contains a excitation filed 1112 that implements the excitation-field $H_f$. Located at opposite ends of the quantum processor are reflective plates 1114 and 1116 that reflect the excitation field back onto the lattice of nodes 1102.

Figure 12:
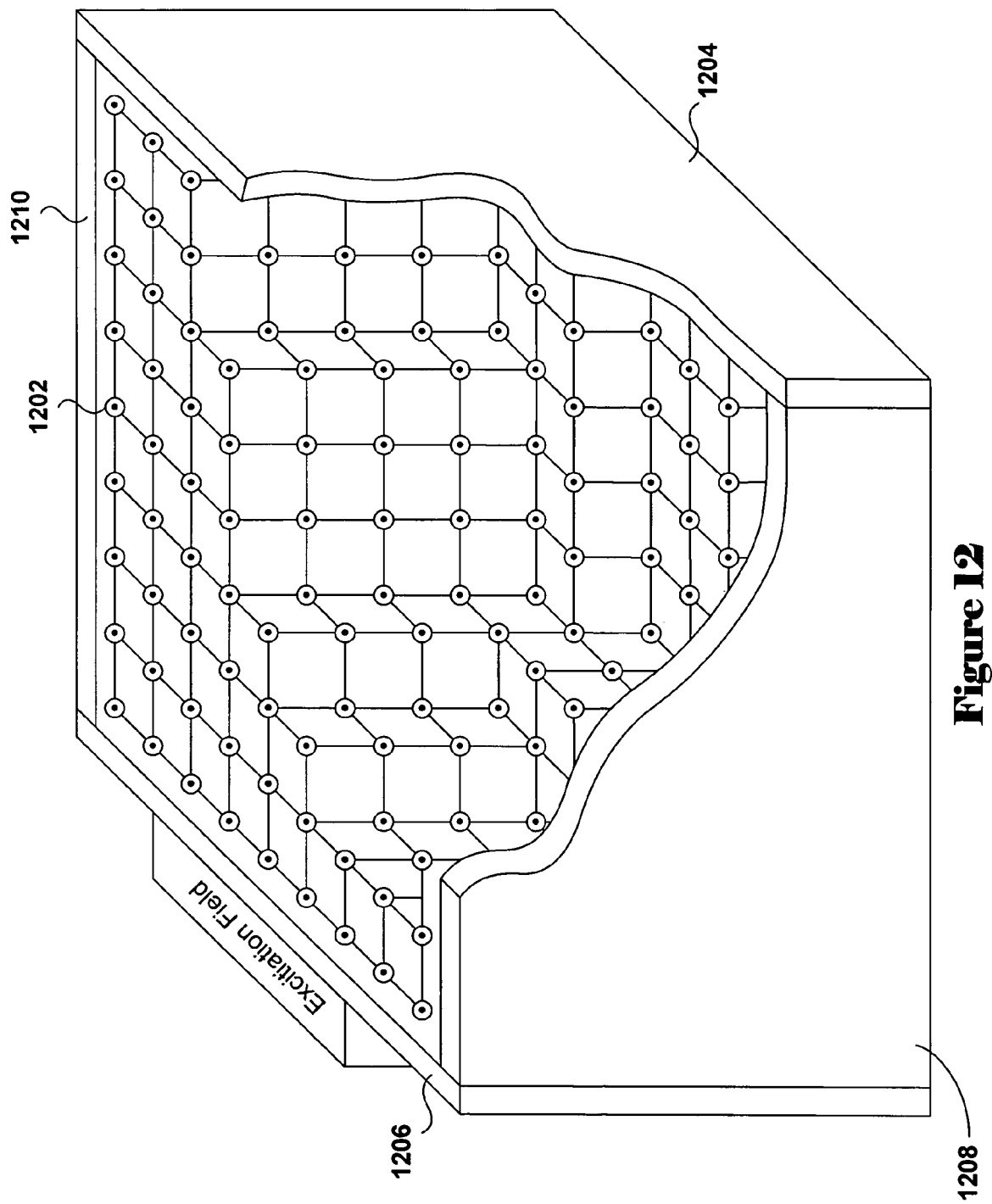
FIG. 12 shows a simple cubic lattice of equally spaced nodes, reflective plates, and insulating boundaries representing one of many possible embodiments of the present invention.

The lattice of nodes is not limited to the rectilinear nodal arrangement shown in FIG. 11. In alternate embodiments, the nodes may be arranged to provide a higher density of nodes, as, for example, by offsetting the nodes in adjacent rows to produce a more closely packed arrangement of nodes. In alternate embodiments, the nodes may be arranged in any number of different three-dimensional lattice structures, as, for example, the simple cubic, body-centered cubic, face centered cubic, primitive face centered cubic, simple hexagonal, hexagonal closest packed, rhombohedral etc. FIG. 12 shows a simple cubic lattice of equally spaced nodes 1202, reflective plates 1204 and 1206, and insulating boundaries 1208 and 1210 that represents one of many possible embodiments of the present invention.

The Hamiltonian realizing the quantum processor prior to receiving the excitation-field $H_f$ from the excitation generator is given by:

$$H = H_0$$

where $H_0$ is the hardware Hamiltonian. Prior to application of the excitation field, the lattice nodes are in the ground vibrational state. After the quantum processor receives the excitation-field $H_f$ from the excitation generator, the quantum processor is characterized by the Hamiltonian given by:

$$H = H_0 + H_f$$

Figure 13:
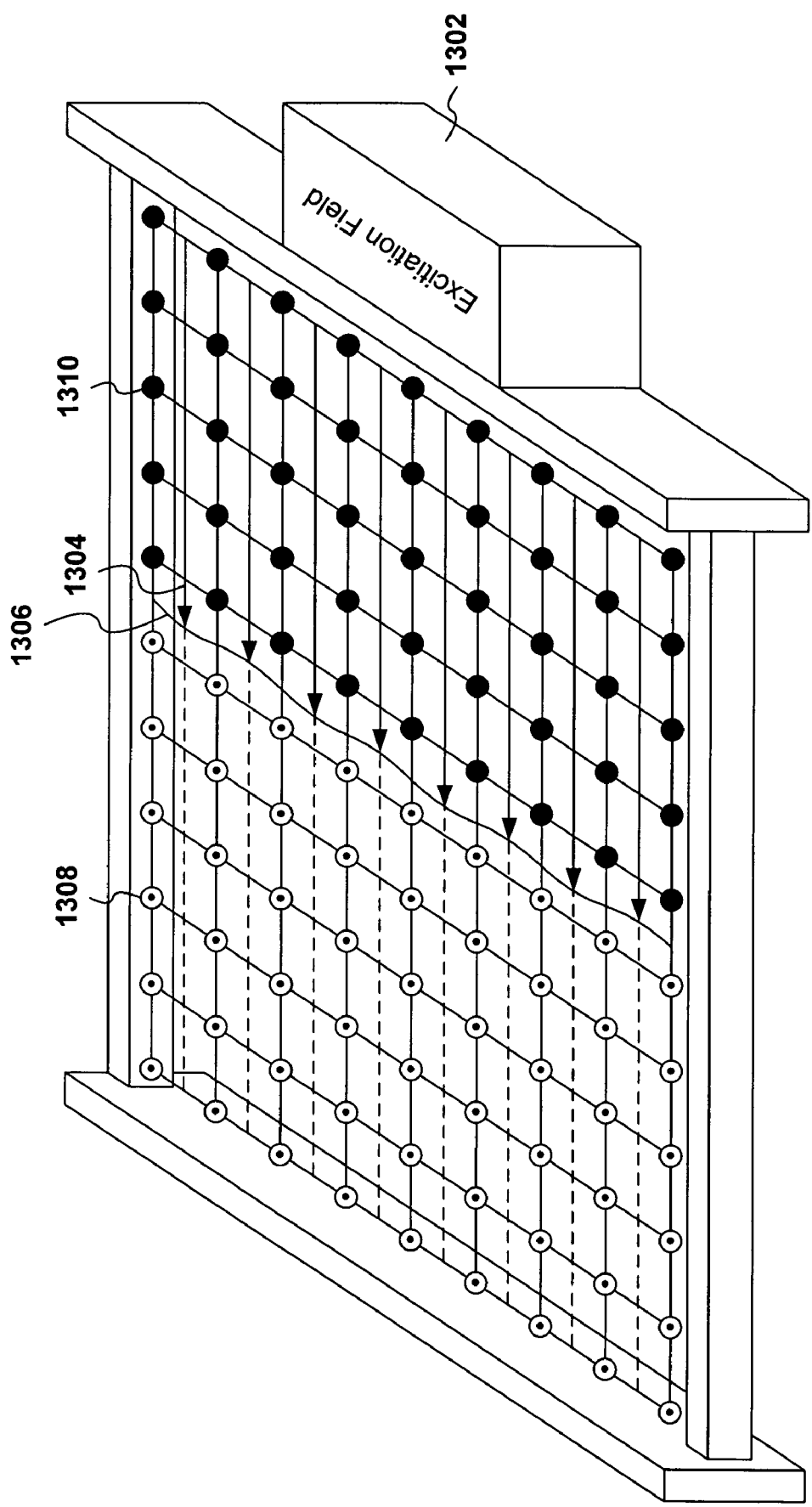
FIG. 13 shows realization of the excitation field $H_f$ generated by the excitation generator.

FIG. 13 shows a hypotheitical excitation-field $H_f$ applied to the hypothetical quantum processor shown in FIG. 11. The excitation-field $H_f$ originates at the excitation field 1302 and sweeps across the quantum processor in the direction 1304. The excitation field wave front 1306 passes over nodes in their ground state exciting each node to a higher vibrational and/or electronic state. The nodes in the ground state are identified by the open circles 1308, and the nodes in an excited state are identified by the solid circles 1310. The rotational quantum states of the nodes are not accessed because each node is bound in the lattice and cannot freely rotate.

Figure 14:
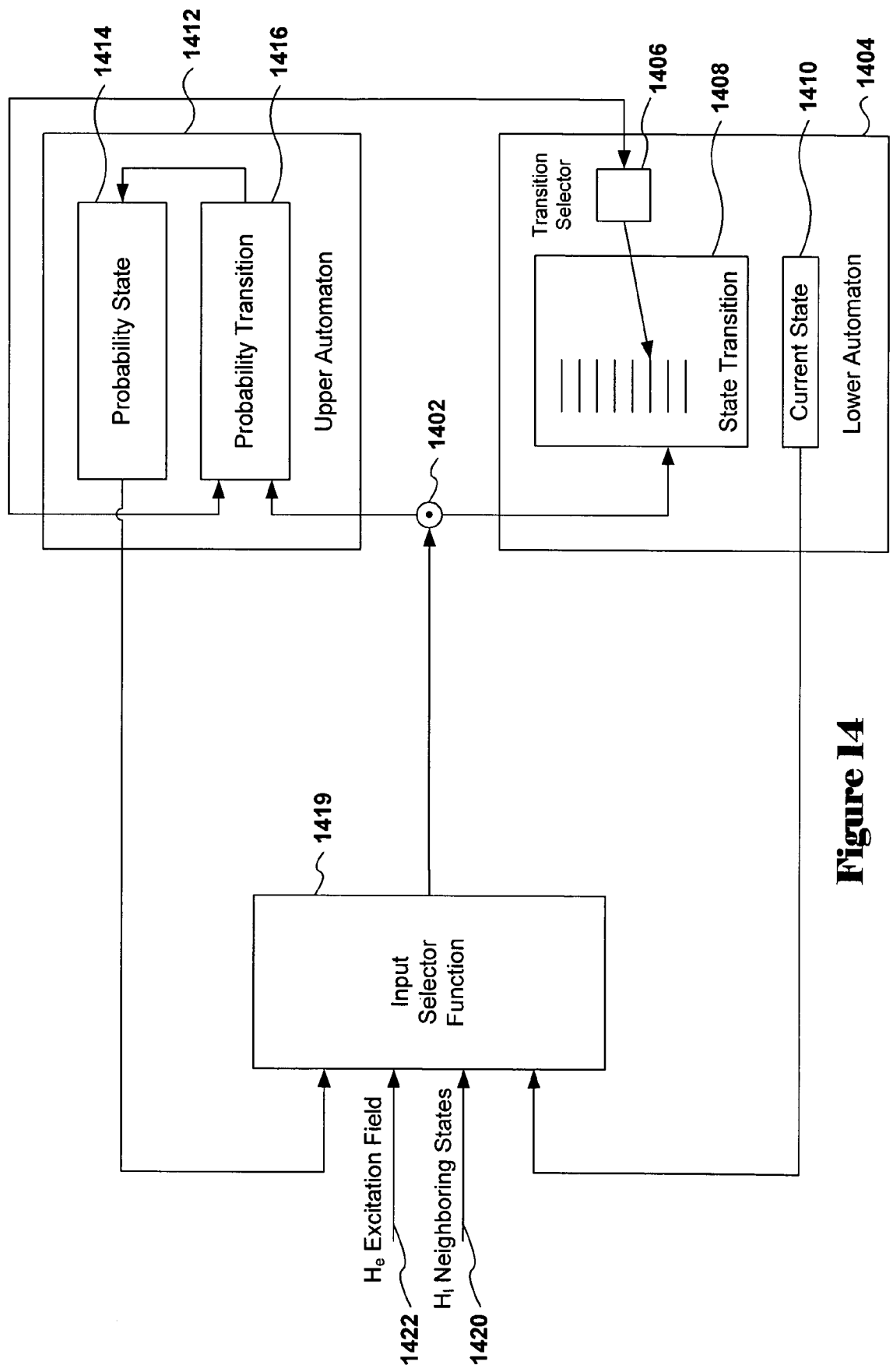
FIG. 14 is a diagram of the two-level automaton for a single node.

FIG. 14 is a diagram of the two-level automaton for a single node 1402. The lower automaton 1404 provides a node's view of the quantum processor consisting of the transition selector 1406, the state transition 1408, and current state 1410. The upper automaton 1412 represents the quantum computing paradigm as described above by the function input 302 in FIG. 3 and consists of the probability state 1414 and the probability transition 1416. The input selector function 1418 is an interface function, carried out by the excitation generator 303 in FIG. 3, that models the interaction of the node 1402 with the excitation field 1418, the neighboring states 1420 of the other nodes in the lattice, probability states 1414, and the current state 1410.

1. The Lower Level Automaton

In the lower automaton 1404, the state transition 1408 characterizes the programmable discrete spectrum of the node and is controlled by the mixing state probability density transition computed in the upper automaton 1412. The transition selector 1406 in the lower automaton 1404 executes the commands issued by the upper automaton 1412. Each node 1402 has a set of pure states given by:

$$S = \{|\Psi_{j_k}(t)\rangle | k \in N_p, N_p \text{ finite}\} \quad (50)$$

where $|\Psi_{j_k}(t)\rangle$ are the pure states of the node, j is the index of the jth node in the quantum processor, k is the quantum number, and $N_p$ is number of available quantum states. Each node in the lattice begins in the ground state $|\Psi_{j_1}(t)\rangle$ and is excited to a higher states $|\Psi_{j_k}(t)\rangle$ by the excitation-field $H_f$ as described above in relation to FIG. 11. After the node has been excited to a higher state by the excitation-field $H_f$, the node spontaneously undergoes relaxation to a lower energy state in S. After a period of time determined by the control and scheduling system 301 in FIG. 3, the lattice of nodes are subsequently re-excited by another excitation-field $H_f$ generated by excitation generator 303. The time duration between the excitation fields is referred to as the "update time" and is denoted by $\Delta$. The update time $\Delta$ of the node is determined to be larger than 10 times the maximum relaxation time of any of the state transitions in the lower automaton.

Each node in the lattice may transition between one or more states in S during the update time $\Delta$ and referred to as "chattering." The chattering effect is described as a combination of the pure states in S and is given as follows:

$$|\Psi_j(\tau)\rangle = \begin{cases} |\Psi_{j_1}(\tau)\rangle & \tau \in I_{j_1}(t) \\ |\Psi_{j_2}(\tau)\rangle & \tau \in I_{j_2}(t) \\ \vdots \\ |\Psi_{j_{N_p-1}}(\tau)\rangle & \tau \in I_{j_{N_p-1}}(t) \\ |\Psi_{j_{N_p}}(\tau)\rangle & \tau \in I_{j_{N_p}}(t) \end{cases} \quad (51)$$

-continued where $$I_{j_k}(t) = \left[ t + \sum_{l=1}^{k-1} \Delta_{j_l}(t), t + \sum_{l=1}^{k} \Delta_{j_l}(t) \right) \quad (52)$$

are the semi-open intervals of the update time interval [t, t+$\Delta$) and give the duration that node j spends in the pure state $|\Psi_{j_k}(\tau)\rangle$. The time interval $\Delta_{j_k}(t)$ is a function of the characteristic excitation or relaxation times associated with the state. See *Fields and Nodes: Field Theory and Dispersion Relations*, by K. Nishijima, Benjamin, Inc., NY, 1969.

Figure 15:
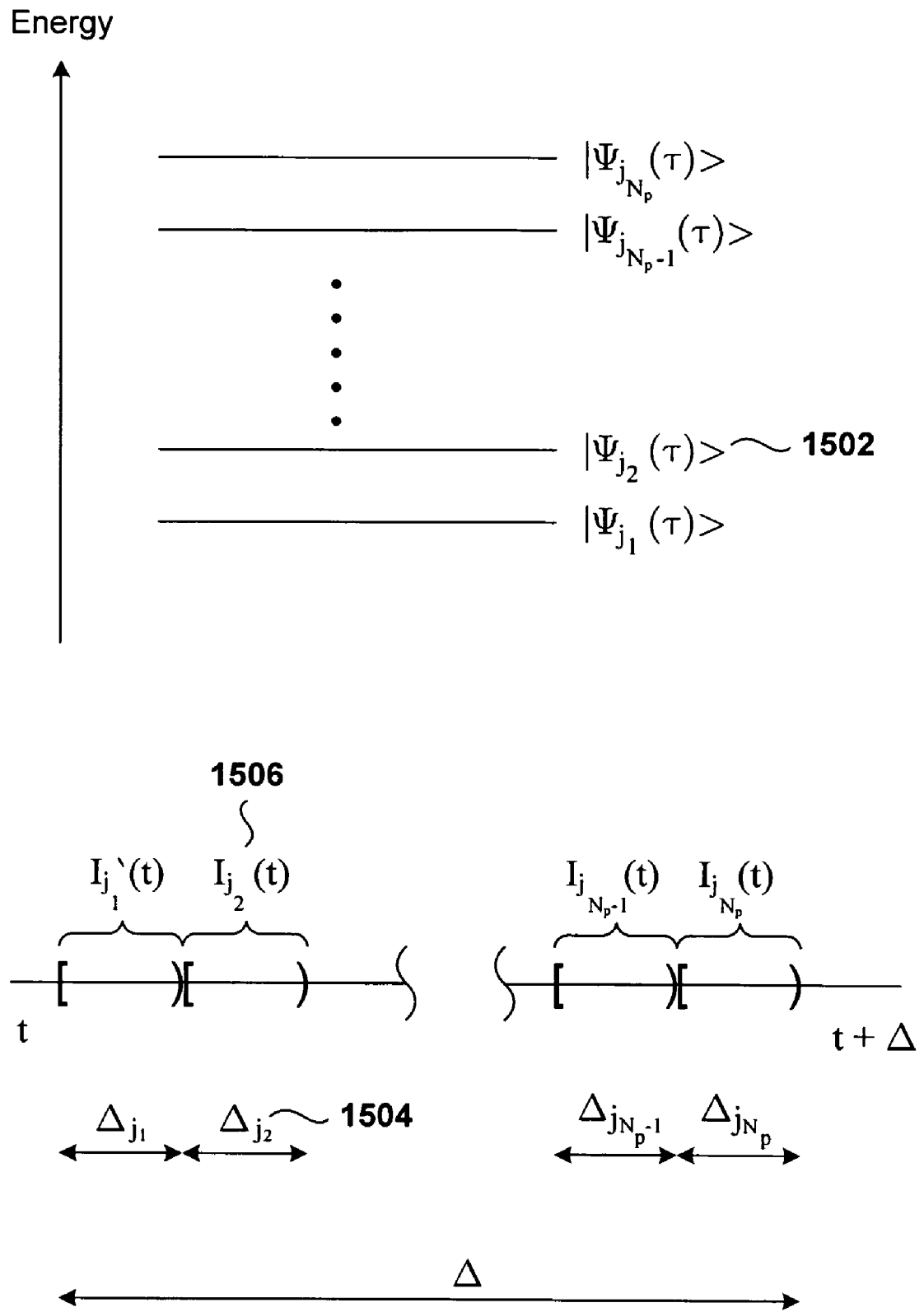
FIG. 15 illustrates the relationship between the chattering combination in equation (51) and the semi-open time intervals in equation (52).

FIG. 15 illustrates the relationship between the chattering combination in equation (51) and the semi-open time intervals in equation (52). The pure states $|\Psi_{j_k}(t)\rangle$ in the chattering combination (51) are arranged vertically in order of increasing energy. The semi-open intervals $I_{j_k}(t)$ appearing in the chattering combination (51) and defined in equation (52) are displayed graphically below the pure states $|\Psi_{j_k}(t)\rangle$. Each semi-open interval $I_{j_k}(t)$ is of length $\Delta_{j_k}$ and represents the amount of time the jth node remains in the pure state $|\Psi_{j_k}(t)\rangle$ during the update time interval [t, t+$\Delta$). For example, the jth node occupies the pure state $|\Psi_{j_2}(t)\rangle$ 1502 for the length of time $\Delta_{j_2}$ 1504 in the interval $I_{j_2}(t)$ 1506. The sum of the time intervals $\Delta_{j_k}$ can be expressed as follows:

$$\sum_k \Delta_{j_k}(t) = \Delta \quad (53)$$

The chattering coefficients can then be defined as:

$$\alpha_{j_k}(t) = \frac{\Delta_{j_k}(t)}{\Delta} \quad (54)$$

which allows equation (53) to be written as:

$$\sum_k \alpha_{j_k}(t) = 1 \quad (55)$$

Figure 16:
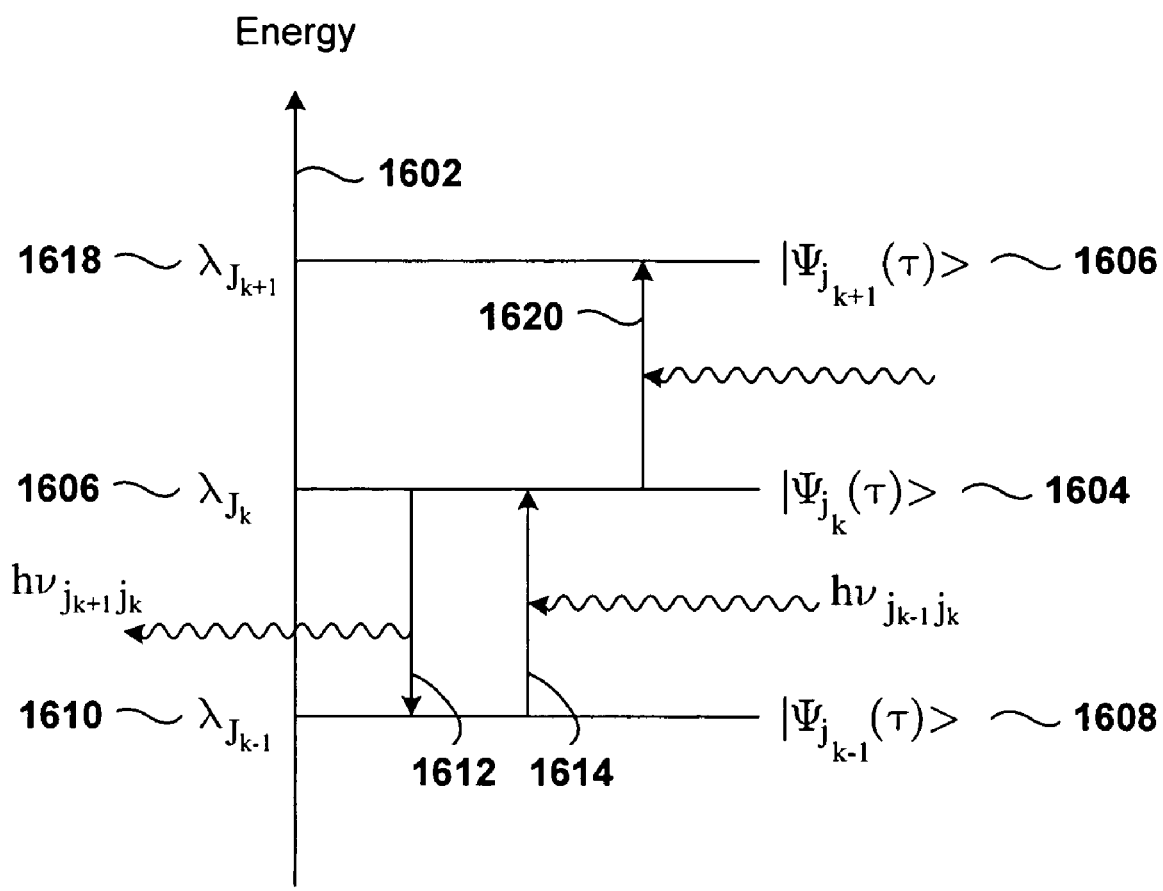
FIG. 16 illustrates chattering for a single hypothetical node using three pure states in the chattering combination (51).

A chattering node may spontaneously transition to a lower state in S giving off radiation to the surroundings, or the node may absorb radiation emitted by other nodes in the system causing the node to transition to higher energy states in S. FIG. 16 illustrates chattering for a single hypothetical node using three pure states in the chattering combination (51) arranged in order of increasing along the energy-axis 1602. First, assume the node begins in state $|\Psi_{j_k}(\tau)\rangle$ 1604 with energy $\lambda_{j_k}$ 1606. The node in the state $|\Psi_{j_k}(\tau)\rangle$ 1604 spontaneously transitions to the lower state $|\Psi_{j_{k-1}}(\tau)\rangle$ 1608 with energy $\lambda_{j_{k-1}}$ 1610 emitting energy $h\nu_{j_{k-1}j_k}$ to the surroundings, as indicated by edge 1612. Second, the node absorbs energy $h\nu_{j_{k-1}j_k}$ from the surroundings, as indicated by edge 1614, the node transitions back to the state $|\Psi_{j_k}(\tau)\rangle$ 1602 with energy $\lambda_{j_k}$ 164. Third, the node absorbs energy with frequency $h\nu_{j_kj_{k+1}}$ from the lattice surroundings, and transitions to the state $|\Psi_{j_{k+1}}(\tau)\rangle$ 1616 with energy $\lambda_{j_{k+1}}$ 1618, as indicated by edge 1620.

For each update time interval [t,t+$\Delta$), the transition selector 1406 receives a command from the upper automaton

1412 in FIG. 14, which is comprised of an ordered tuple of chattering coefficients $\{\alpha_{j_k}(t)|j_k \epsilon N_p\}$. The Transition Selector 1406 then computes the chattering combination of mixed states $|\Psi_{j_k}(t)\rangle$ according to equation (51).

2. The Upper Level Automaton

In general, there is not enough information to determine a specific state function that characterizes the lattice or any of the lattice nodes. Therefore, the best description of the computation is a probabilistic description. In the quantum formalism, the description is referred to as the "probability density description." See *Probabilistic Model of Quantum Relation*, V. F. Weisskopf and E. Wigner, Physik 63, pp. 54–62, 1930.

Consider again the set of pure states in the lower automaton given by equation (54). Let $p_j$ be the probability that the jth node is in the pure state $|\Psi_j(t)\rangle$. Then the probability density operator is defined by:

$$\rho(t) = \sum_j p_j |\Psi_j(t)\rangle\langle\Psi_j(t)| \qquad (56)$$

and can be used to determine the probability of a particular quantum state. Differentiating equation (56) and substituting equation (40) gives the differential operator:

$$i\hbar \frac{\partial}{\partial t}\rho = H \cdot \rho - \rho \cdot H \qquad (57)$$

The operator on the right-hand side of equation (57) is termed the "commutator" and can be written as $[H, \rho]$. Thus equation (57) becomes:

$$i\hbar \frac{\partial}{\partial t}\rho = [H, \rho] \qquad (58)$$

Equation (58) characterizes the computation carried out by the upper automaton 1412 in FIG. 14. The results obtained by the upper automaton 1412 is the probability of the node being in the state $|\Psi_j(\tau)\rangle$.

Given the density operator in equation (56) the ensemble average for the lattice can be determined by the trace of the matrix $\rho \cdot C$ and is given by the expression:

$$\langle C \rangle = \text{trace}(\rho \cdot C) \qquad (59)$$

where C can be any quantum mechanical operator. For example, the vibrational Hamiltonian characterizing the vibrational motion of the nodes is substituted for the operator C to give the ensemble average of the vibration states. The ensemble average calculated for an operator C is carried out by the transducer 305 in FIG. 3.

Notice that the state function $|\Psi_j(t)\rangle$ is given as a chattering combination in equation (51) and can equivalently be written as a linear combination of the states in S as follows:

$$|\Psi_j(t)\rangle = \sum_k \alpha_{j_k}(t) |\Psi_{j_k}(t)\rangle \qquad (60)$$

where the coefficients $\alpha_{j_k}(t)$ are the chattering coefficients given by equation (54). The equivalence between the linear combination in equation (60) and the chattering combination in equation (51) is established in the following version of the Chattering Lemma:

Let $S=\{|\Psi_{j_k}(t)\rangle | k \epsilon N_p, N_p \text{ is finite}\}$ and let $\hat{S}$ be the set of chattering combinations of S. Let a real positive number $\epsilon$ be given. There exists state functions $|\Theta_j\rangle \epsilon \hat{S}$, defined for each tuple given by:

$$\left\{\alpha_1, \ldots, \alpha_{N_p} \mid \alpha_l \geq 0, \sum_{l=0}^{N_p} \alpha_l = 1\right\} \qquad (61)$$

such that $$\max_t \left| \int_0^t \left\{ |\Theta_j(\tau)\rangle - \sum_{k=1}^{N_p} \alpha_{j_k} |\Psi_{j_k}(\tau)\rangle \right\} \right| < \varepsilon \qquad (62)$$

for all $\{\alpha_1, \ldots, \alpha_{N_p}\}$.

The Chattering Lemma says that every chattering combination of the form of equation (51) on a set S can be realized as a linear combination of elements from S with an arbitrarily small error. Under strong continuity assumptions of the state functions, the converse of the lemma is also true. By choosing the boundary conditions in the lattice appropriately, the continuity assumption is not limiting.

Although the linear combination given in equation (60) can be used to represent the state function $|\Psi_j(t)\rangle$ of the jth node, formulating the state function in the form of the chattering combination in equation (51) allows for formulating the sequence of excitation steps.

3. The Input Selector Function

Figure 17:
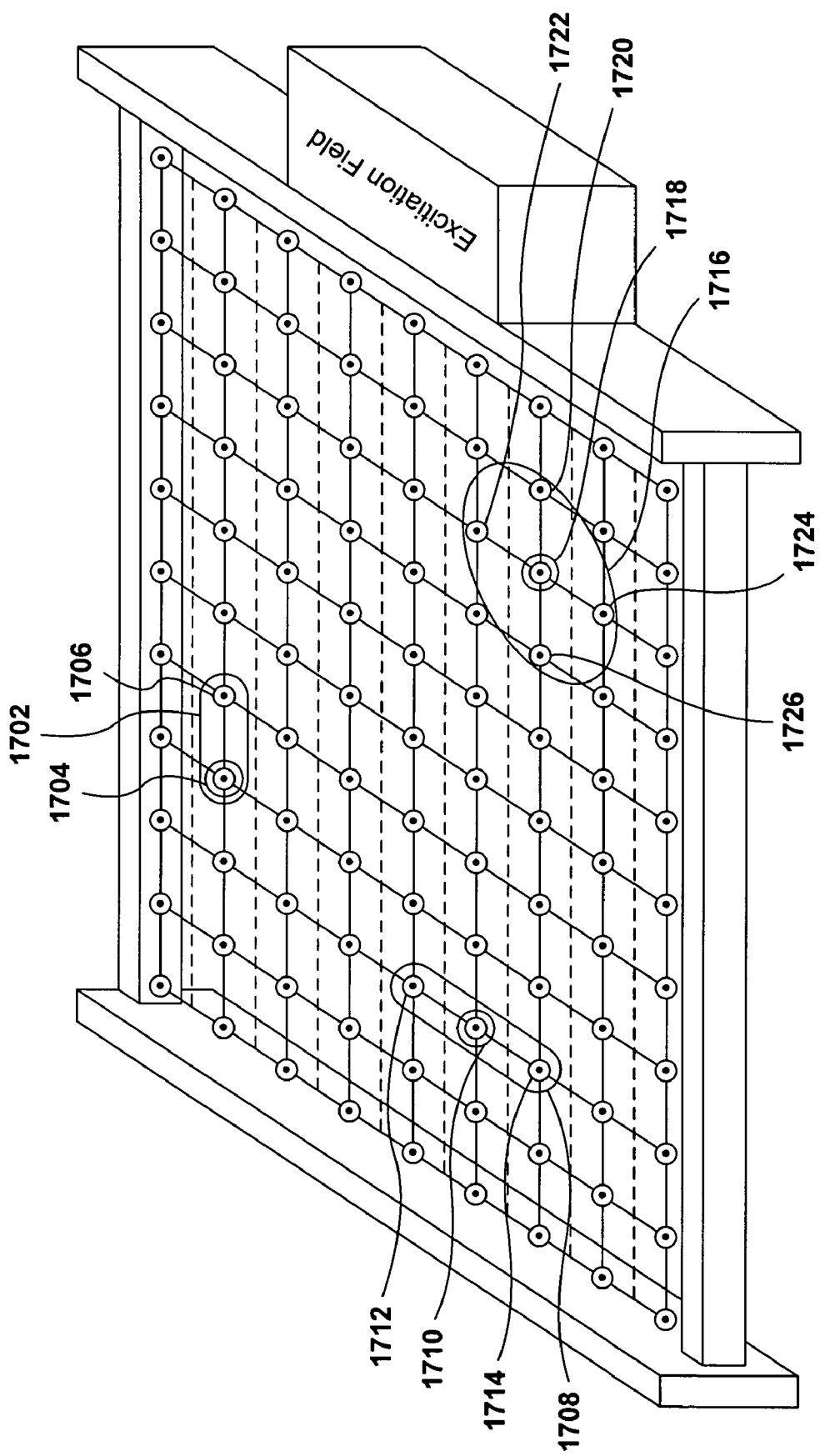
FIG. 17 shows examples of lattice node interactions.

The Input Selector Function 1418 in FIG. 14 utilizes the information received from the current state 1410 of the node, the probability state 1414, models the interaction of a node in the lattice with the excitation field 1418 and with the electric fields generated by neighboring nodes 1420 to generate $H_f$. FIG. 17 shows examples of the kinds of lattice node interactions. For the sake of simplicity, only nearest neighbor interactions are shown in FIG. 17, however, the present invention can accommodate other node interactions. Oval 1702 identifies a dipole moment interaction resulting from a node 1704 interacting with a nearest neighboring node 1706. Oval 1708 identifies a tripole moment interaction created by a node 1710 interacting with two neighboring nodes 1712 and 1714. Oval 1716 identifies a quadrupole interaction between a node 1718 neighboring nodes 1720, 1722, 1724, and 1726.

Figure 18:
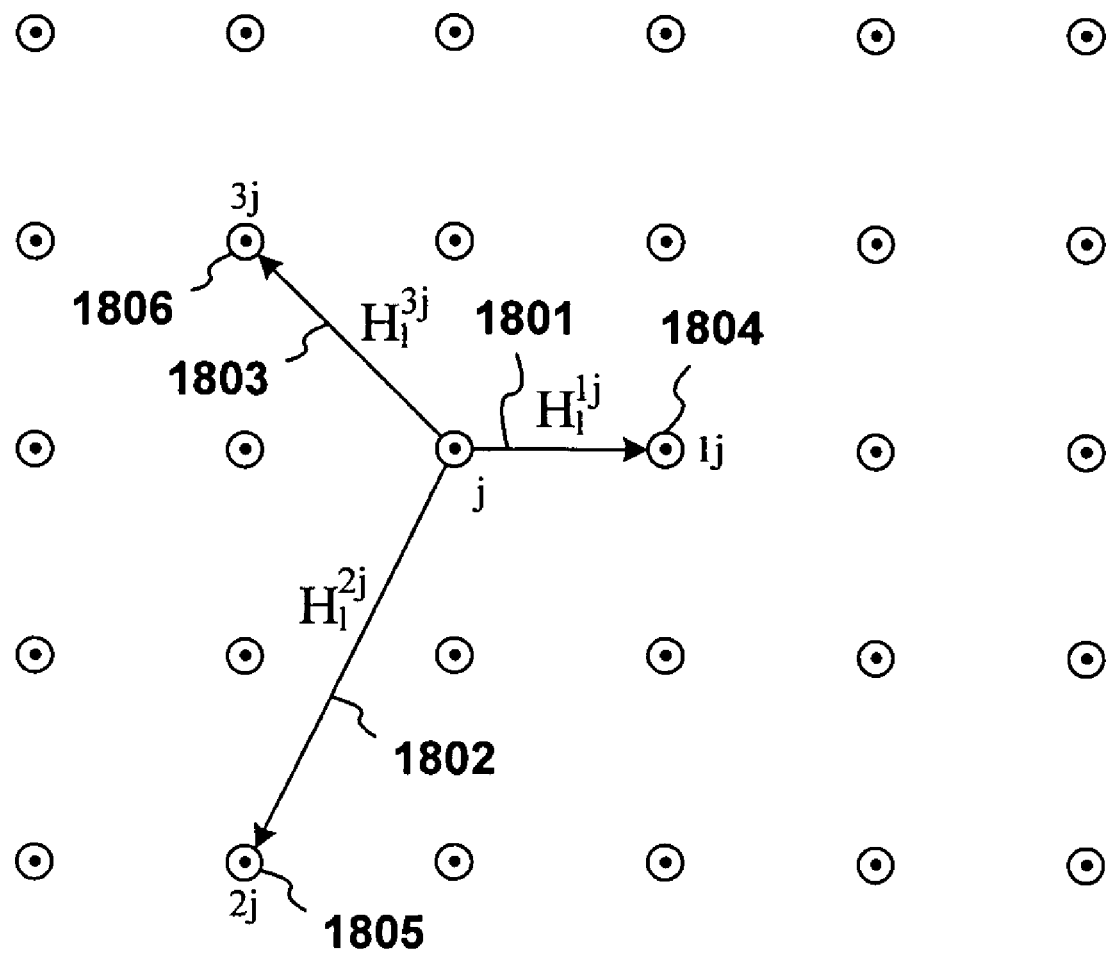
FIG. 18 illustrates the interactions characterized by the interaction Hamiltonian $H_I$.

In order to distinguish the excitation field from the electric fields generated by other nodes in the lattice, the excitation-field Hamilitonian $H_f$ can be written as the sum of two terms as follows:

$$H_f = H_e + H_I \qquad (63)$$

where $H_e$ is the interaction of the node with the excitation field, and $H_I$ is the interaction of the node with other nodes in the lattice. The interaction Hamiltonian $H_I$ for a given node can be written as:

$$H_I |\Psi_j(t)\rangle = g_\Psi(H_I^{i_1}, \ldots, H_I^{i_k}) |\Psi_j(t)\rangle \qquad (64)$$

where for the jth node, $H_I^{i_j}$ is the interaction Hamiltonian of the node j with "neighboring" nodes $i_j$, and $g_\Psi$ is referred to as the "neighboring function" at the current state of the node $|\Psi_j(t)\rangle$. FIG. 18 illustrates the notation for a hypothetical interaction Hamiltonian $H_I$ given by:

$$g_{\Psi}(H_I^{1j}, H_I^{2j}, H_I^{3j})$$

Edges 1801–1803 identify the interaction Hamiltonians $H_I^{1j}$, $H_I^{2j}$, and $H_I^{3j}$ between the node j and the neighboring nodes $1_j$ 1804, $2_j$ 1805, and $3_j$ 1806, respectively. The neighborhood function $g_{\Psi}$ represents the locus structure of interaction of the node j in the lattice at the current state $|\Psi_j(t)\rangle$.

The structure of interaction Hamiltonian $H_I$ can be determined by constructing the Lagrangian associated with the lattice and applying the canonical quantization procedure discussed above in subsection I. D. The elements of carrying out this task are well known but the details depend on the physical characteristics of the lattice. The approach consists of defining potentials to characterize the lattice node interactions. For example, a dipole interaction as shown by oval 1702 in FIG. 17 may be characterized by a potential of the form:

$$V(x, y, t) = d_{x-y}(t)\frac{1}{r_{ij}} \quad (65)$$

where $d_{x-y}(t)$ is a relaxation function and $r_{ij}$ is the distance between nodes i and j.

For purposes of analysis and to determine a detailed formulation of the realization step described above in section I.F, assume that a finite set of primitive excitation Hamiltonians is given by:

$$T=\{H_e^i | i=1, \ldots, N_e\} \quad (66)$$

where $N_e$ is the number of excited states available to the node j. The primitive excitation Hamiltonians given in equation (66) can be realized and implemented by chattering among the elements in the set T over the update time $\Delta$. Chattering among the elements of T is given by the chattering equation:

$$H_e | \Psi(\tau)\rangle = \begin{cases} H_e^{i_1} | \Psi(\tau)\rangle & \tau \in I_{i_1}(t) \\ H_e^{i_2} | \Psi(\tau)\rangle & \tau \in I_{i_2}(t) \\ \vdots & \\ H_e^{i_{N_e-1}} | \Psi(\tau)\rangle & \tau \in I_{i_{N_e-1}}(t) \\ H_e^{i_{N_e}} | \Psi(\tau)\rangle & \tau \in I_{i_{N_e}}(t) \end{cases} \quad (67)$$

where the sets $I_{i_k}(t)$ are defined by equation (52) above and $|\Psi(\tau)\rangle$ is a state function. The probabilistic resonance chattering equation (67) is central to the implementation of the quantum processor. The idea is to induce a probability distribution $\rho$ on the states of the nodes in the lattice so that the realization criterion is satisfied.

Figure 19A:
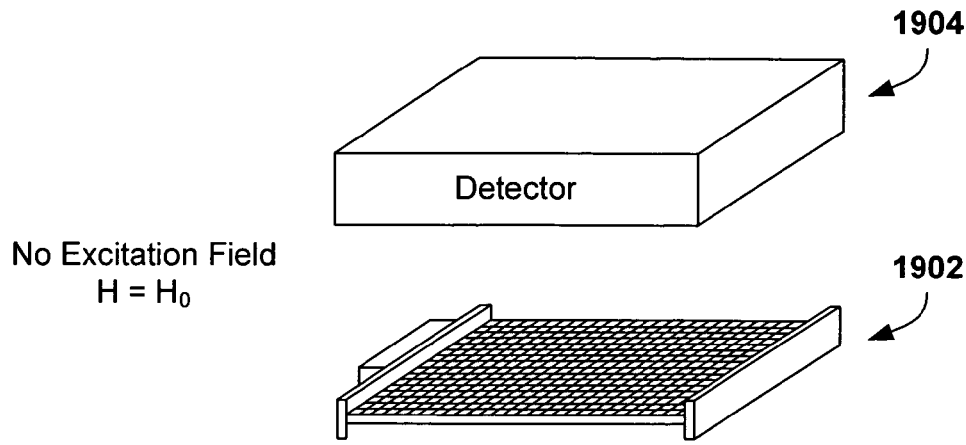
FIGS. 19 A–C illustrate a single hypothetical run of the excitation field Hamiltonian $H_f$ used to obtain a hypothetical spectrum from the quantum processor.
Figure 19B:
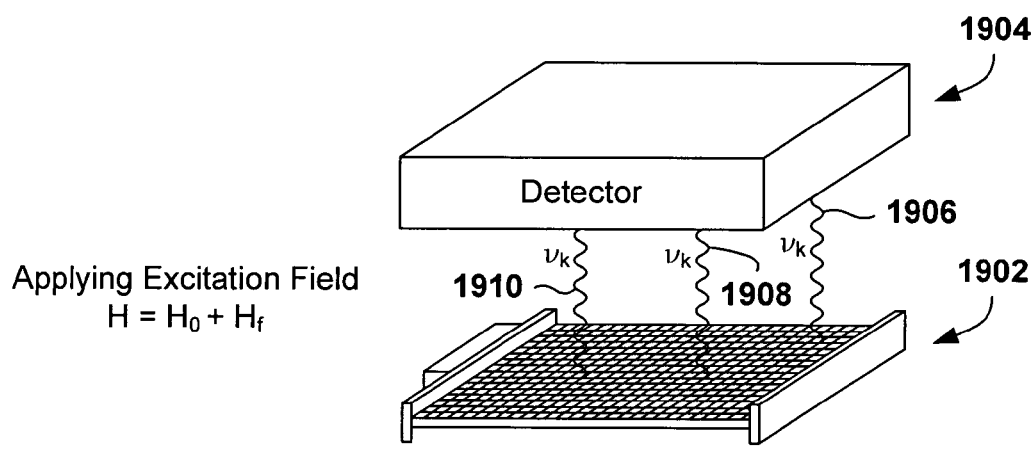
Figure 19C:
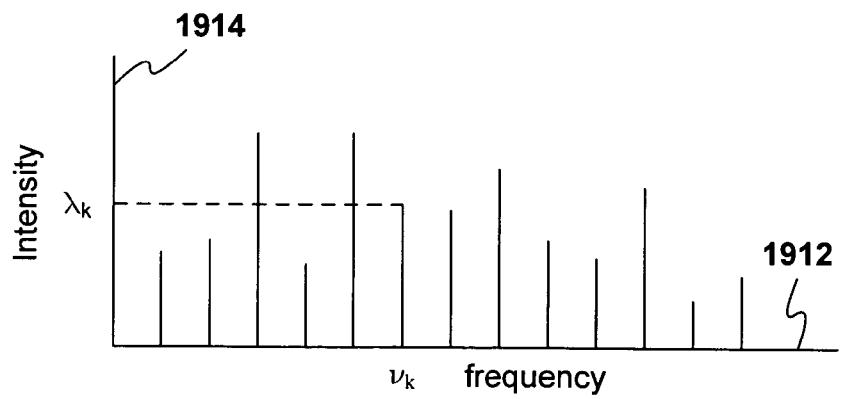
Figure 20:
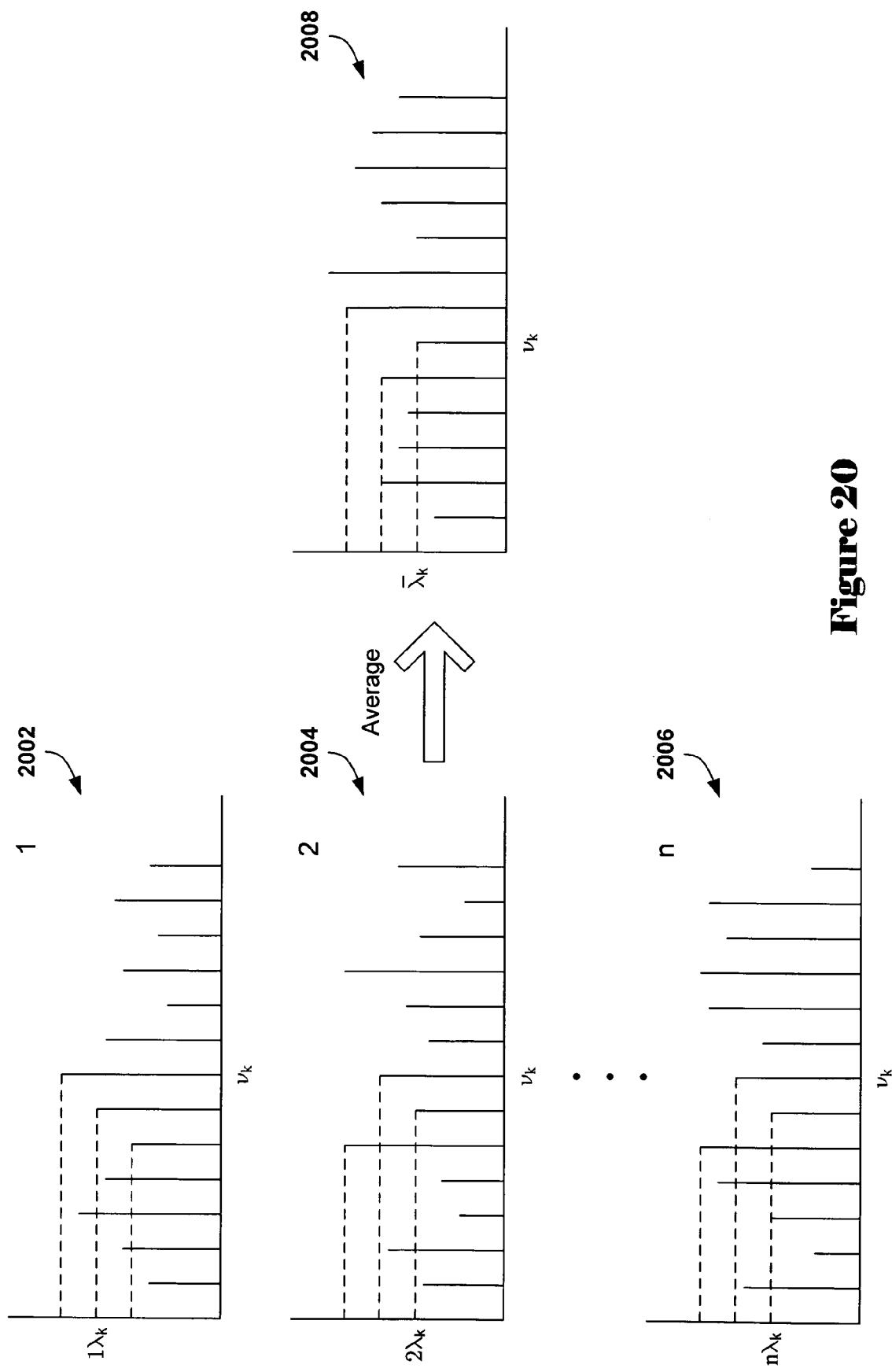
FIG. 20 shows example hypothetical spectra and the average spectrum after n hypothetical runs of the excitation field $H_f$.

FIGS. 19 and 20 show how a hypothetical quantum processor can be used to obtain an approximation to the function $\Phi$. FIGS. 19A–C illustrate a single hypothetical run of the excitation-field Hamiltonian $H_f$ used to obtain a hypothetical spectrum from the quantum processor. In FIG. 19A, all of the nodes of the quantum processor 1902 begin in the ground state and can be characterized by the hardware Hamiltonian $H_0$. The detector 1904 coverts the incident radiation into an electrical current which is used to count the number of photons. In FIG. 19B, the excitation-field $H_f$ impinged upon the quantum processor 1802 via the excitation generator 303 in FIG. 3. The excited nodes emit light radiation in the form of photons that strike the detector 1904, as indicated by radiating lines 1906, 1908, and 1910. FIG. 19C shows a plot of the frequencies along the horizontal axis 1914 and the corresponding intensities along the vertical axis 1916 for the single application of the excitation-field Hamiltonian $H_f$. The radiating lines 1906, 1908, and 1910 are associated with nodes that emit radiation of the same frequency $v_k$ and are included in determining the intensity value $\lambda_k$. The resulting spectrum intensities $\{\lambda_1, \lambda_2, \ldots\}$ shown in FIG. 19C are stored in the coherent memory 306 in FIG. 3.

FIG. 20 shows example hypothetical spectra and the average spectrum after n hypothetical runs of the excitation-field $H_f$. The n spectra indicated by spectrum 2002, 2004, and 2006 are used to compute an average spectrum 2008. Approximately $10^{12}$ runs are used to determine the average spectrum 2008 where each run takes about 0.2 nanoseconds to complete. Rather than store the spectrum for each run, a running average of the intensities, referred to as $\{\overline{\lambda}_1, \overline{\lambda}_2, \ldots\}$ is stored in the coherent memory 306 in FIG. 3. The average spectrum can be used to approximate the function $\Phi(x)$ in equation (42) by the following:

$$\Phi(x) = \sum_{k \in [0, p^N-1]} \sqrt{\overline{\lambda}_k} \, \phi_k(x) \quad (68)$$

D. The Read-Out Period

Figure 21:
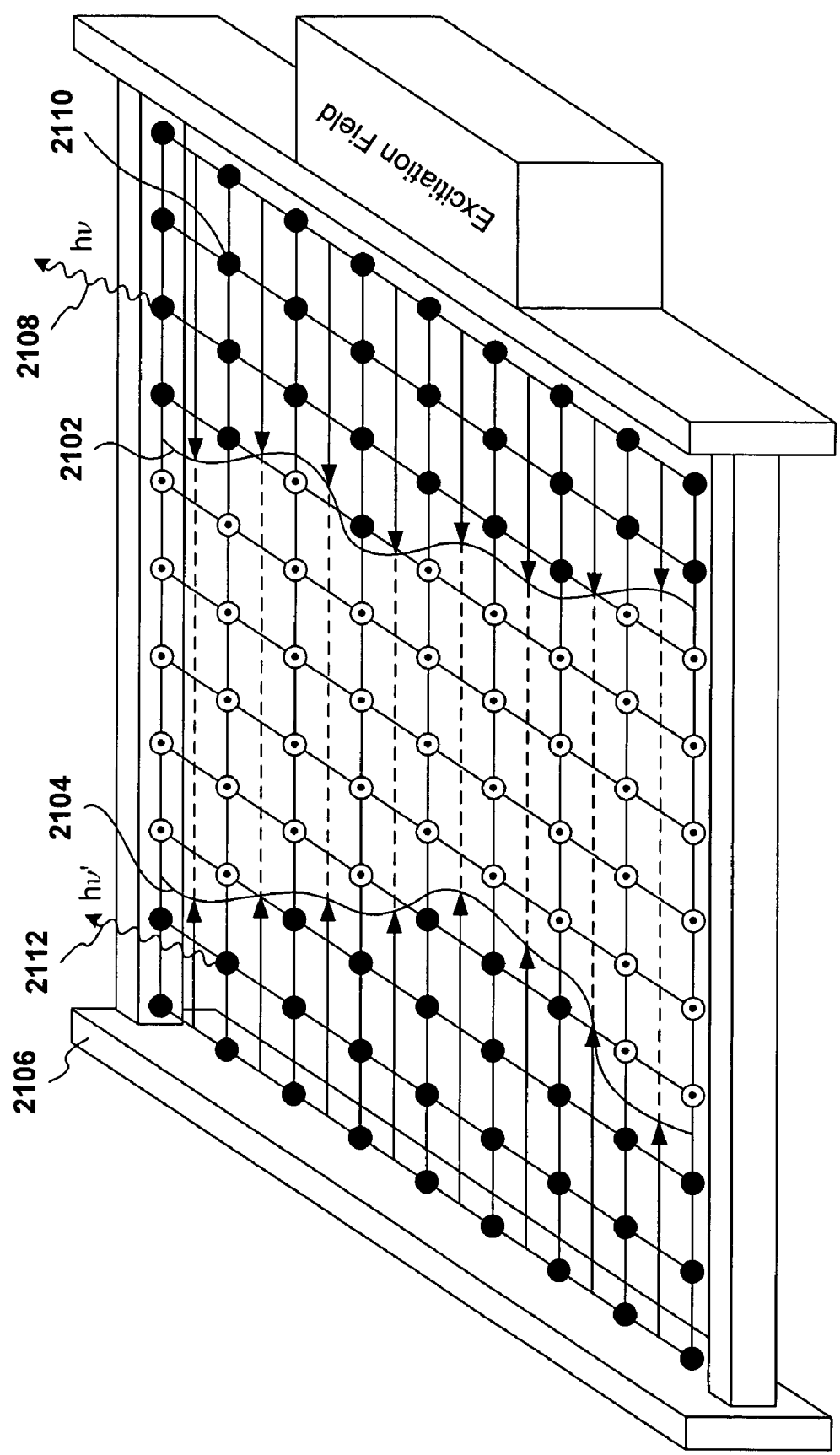
FIG. 21 is an illustration of forward and backward propagating wave trains.

The read-out period, referred to as "$\zeta$," is the amount of time the transducer devotes to reading the light radiation emitted from the quantum processor in step 410 in FIG. 4. If the transducer collects singles from the quantum processor for too long, there is a danger of de coherence due to emissions caused by nodal interaction characterized by the interaction Hamiltonian $H_I$. For example, a computation carried out in the lattice of the quantum processor begins with a propagating probabilistic wave train as described above in relation to FIG. 13. FIG. 21 is an illustration of a forward propagating wave train 2102 and a backward propagating wave train 2104. After the initial excitation-field $H_f$ impinges upon the lattice, the forward propagating wave train 2102 sweeps across the lattice of nodes, where some of the energy stored in the excitation field is converted into nodal excitation energy. The nodes respond after excitation by relaxing to lower energy states by releasing light radiation hv2108. The excitation field sloshes back and forth in the form of forward and backward moving wave trains 2102 and 2104, respectively, until the entire excitation field $H_f$ has been consumed and converted to light energy via nodal excitation. During this time period radiation continues to be emitted as a result of nodal interaction characterized by the interaction Hamiltonian $H_I$ of different energies hv'2110, which can distort the intensity-versus-frequency spectrum. Therefore, in order to limit the amount of light radiation emitted as a result of nodal interaction from contributing significantly to the intensity-versus-frequency spectrum, the readout period $\zeta$ for the transducer is considerably shorter than the amount time it takes for the excitation field to dissipate.

Figure 22:
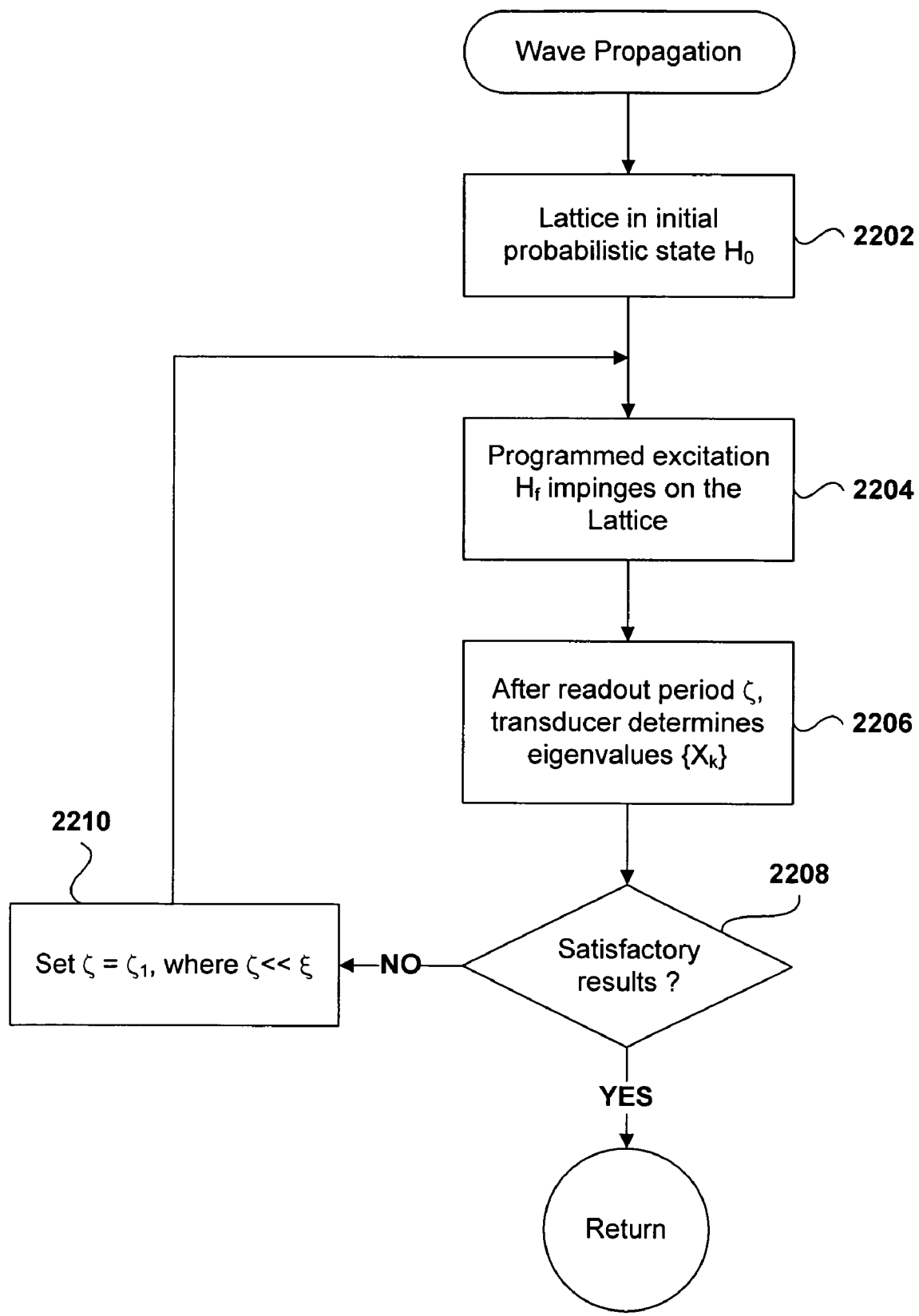
FIG. 22 is a control-flow diagram depicting determination of the transducer read out period that represents one of many possible embodiments of the present invention.

FIG. 22 is a control-flow diagram depicting determination of the transducer read-out period $\zeta$ representing one of many possible embodiments of the present invention. In step 2202, the quantum processor lattice is at an initial probabilistic state characterized by the hardware Hamiltonian $H_0$. In step 2204, the programmed excitation-field $H_f$ determined by the function input 302 and realized by the excitation generator 303 in FIG. 3 impinges upon the quantum processor lattice of nodes. In step 2206, after a read-out period $\zeta$ has elapsed, the transducer 305 in FIG. 3 transmits the spectrum intensities and corresponding frequencies to the coherent memory 306 in FIG. 3. In step 2208, if the resulting equation (68) does not approximate the encoding function within parameters set by the operator, then in step 2210, the read-out period $\zeta$ is extended to a longer read-out period $\zeta_1$ and the computation is started again from the initial probabilistic state. In step 2208, if the resulting average spectrum intensities $\{\bar{\lambda}_1, \bar{\lambda}_2, \ldots\}$ are satisfactory, then the computation is complete and an approximation to the encoding function has been determined.

The read-out period $\zeta$ cannot be extended arbitrarily because thermal relaxation mechanisms inherent in a quantum mechanical system will eventually induce de coherence. In order to demonstrate this, consider the discrete spectrum $\{E_i\}$ of the hardware Hamiltonian $H_0$ given by the eigenvalue equation:

$$H_0|\Psi_i(t)\rangle = E_i|\Psi_i(t)\rangle \tag{69}$$

where $|\Psi_i(t)\rangle$ are the corresponding eigenfunctions. Using equation (58), the transition probability matrix elements $\rho_{ij}$ satisfies the expression:

$$i\hbar \frac{\partial}{\partial t}\rho_{ij}(t) = (E_i - E_j)\cdot \rho_{ij} + [H_f, \rho]_{ij} \tag{70}$$

where the matrix elements are given by:

$$\rho_{ij} = \langle \Psi_i(t)|\rho|\Psi_j(t)\rangle = \int_0^\infty \Psi_i^*(x,t)\rho\Psi_j(x,t)\,dx \tag{71}$$

where $\Psi_i^*(x,t)$ is the complex conjugate of the function $\Psi_j(x,t)$. If the system is in the state $|\Psi_j(t)\rangle$ at time t equal to zero, then the presence of the relaxation Hamiltonian $H_I$ given by equation (54) causes the corresponding probability density matrix elements $\rho_{jj}$ to decay exponentially with time. See *Fields and Nodes: Field Theory and Dispersion Relations*, K. Nishijima, Benjamin, Inc., N.Y., 1969. For small values of t, the diagonal matrix elements $\rho_{jj}$ are the largest terms in the matrix representation of the probability density operator. Assuming no excitation and using equation (57), the term $\rho_{jj}$ satisfies the following equation:

$$i\hbar \frac{\partial}{\partial t}\rho_{ii} = \sum_k \left((H_I)_{jk}\rho_{jk} - \rho_{jk}(H_I)_{kj}\right) \tag{72}$$

where $$i\hbar \frac{\partial}{\partial t}\rho_{ji} \cong (E_j - E_i)\cdot \rho_{ji} - \rho_{jj}\cdot (H_I)_{ji} \tag{73}$$

for i not equal to j. The solution of equations (72) and (73) is given by:

$$\rho_{jj}(t) = e^{-t/\xi} \tag{74}$$

where $\xi$ is the relaxation time that depends on the physical characteristics of the quantum processor lattice. The relaxation time is the time required for the wave train to achieve de coherence. Therefore, the effect of the inter-node excitation Hamiltonian $H_I$ is to randomize the state transitions in each node corrupting the computation described above. Therefore, the read-out period $\zeta$ must be chosen so that this effect is acceptable. In other words, the read-out period is selected so that $$\zeta << \xi \tag{75}$$

The upper bound $\xi$ is used in the design specification of the quantum processor and in the computability analysis.

Although the present invention has been presented in terms of a particular embodiment, it is not intended that the invention be limited to this embodiment. Modifications within the spirit of the invention will be apparent to those skilled in the art.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description; they are not intended to be exhaustive or to limit the invention to the precise forms disclosed, obviously many modifications and variations are possible in view of the above techniques. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for computing a value, the method comprising:
   providing input data, a program of computable functions that describes computation of the value to be computed, and one or more uninstantiated variables;
   encoding the program in a discrete partial recursive function;
   continualizing the discrete partial recursive function to obtain a first-order, time-dependent differential equation;
   expressing the first-order, time-dependent differential equation as a differential operator;
   for N trials,
     realizing the differential operator in a physical medium, and
     extracting, from the physical medium, signals that correspond to substantiated variables; and
   outputting the value that corresponds to an average of the substantiated variables over the N trials.

2. The method of claim 1 wherein the uninstantiated variables further includes allocating storage for the variables.

3. The method of claim 1 further includes compiling the data and program of computable functions in terms of an assembly code expressed from a set of discrete computable functions.

4. The method of claim 3 wherein encoding the program of computable functions further includes converting the assembly code into the discrete partial recursive functions.

5. The method of claim 1 wherein continualizing the discrete partial recursive function further includes:
- determining an interpolating function that interpolates the discrete partial recursive function;
- parameterizing the interpolating function; and
- transforming the parameterized interpolating function into the first-order, time-dependent, differential equation.

6. The method of claim 1 wherein expressing the first-order, time-dependent differential equation as the differential operator further includes formulating a corresponding quantum canonical Hamiltonian operator.

7. The method of claim 6 wherein formulating the corresponding quantum canonical Hamiltonian operator further includes:
- formulating a problem Lagrangian that characterizes the first-order, time-dependent differential operator;
- converting the problem Lagrangian into a problem Hamiltonian; and
- converting the problem Hamiltonian into the quantum, canonical Hamiltonian.

8. The method of claim 1 wherein realizing the differential operator in a physical medium further includes converting the differential operator into an excitation field.

9. The method of claim 1 wherein extracting from the physical medium signals that correspond to the substantiated variables further includes converting emitted radiation into a coherent spectrum of intensities and corresponding frequencies.

10. The method of claim 1 wherein outputting the instantiated variables further includes storing the computed value.

11. A system for computing a value, the system comprising:
- a control and scheduling system;
- a function input that converts a program of computable functions into an excitation field Hamiltonian;
- an excitation generator that instantiates the excitation field Hamiltonian into an excitation field;
- a quantum processor that converts the excitation field into emitted radiation;
- a transducer that converts the emitted radiation into a spectrum of intensity and corresponding frequency data; and
- coherent memory that stores and maintains a running average of the spectrum of intensity and corresponding frequency data.

12. The system of claim 11 wherein the control and scheduling system further includes iterated execution of the excitation generator, the quantum processor, and the transducer until the average spectrum of intensities converges to a constant value.

13. The system of claim 11 wherein the excitation field excites polymer fragment molecule nodes in the lattice of the quantum processor.

14. The system of claim 13 wherein the excited polymer fragment molecule nodes emit coherent radiation.

15. A quantum computer processor, the quantum computer processor comprising:
- a lattice of one or more polymer molecule nodes having four orthogonal sides;
- a first insulating boundary having a first end and a second end located along a first side of the lattice;
- a second insulating boundary having a first end and a second end located along a second side of the lattice and opposite the first side of the lattice;
- a first reflective plate fastened to the first ends of the first and second insulating boundaries and located along a third side of the lattice; and
- a second reflective plate fastened to the second ends of the first and second insulating boundaries located along a fourth side of the lattice opposite the third side of the lattice.

16. The apparatus of claim 15 wherein the nodes are polymer fragment molecules.

17. The apparatus of claim 15 wherein the one or more nodes are connected by one or more forward and lateral bonds.

18. The apparatus of claim 17 wherein the forward and lateral bonds are polymer fragment molecules.

19. The apparatus of claim 15 wherein the lattice is a two-dimensional planar arrangement of nodes.

20. The apparatus of claim 15 wherein the lattice is a three-dimensional arrangement of nodes.

* * * * *